United States Patent
Bryant et al.

(10) Patent No.: US 8,816,905 B2
(45) Date of Patent: Aug. 26, 2014

(54) SATELLITE-BASED POSITIONING SYSTEM IMPROVEMENT

(75) Inventors: Roderick C. Bryant, Conder (AU);
Andrew G. Dempster, Coogee (AU);
Stanley L. Dougan, Calwell (AU);
Trevor Hobbs, Hughes (AU); Eamonn P. Glennon, Beaumont Hills (AU)

(73) Assignee: u-blox AG, Thalwil (CH)

( * ) Notice: Subject to any disclaimer, the term of this patent is extended or adjusted under 35 U.S.C. 154(b) by 0 days.

(21) Appl. No.: 13/404,304

(22) Filed: Feb. 24, 2012

(65) Prior Publication Data

US 2012/0249367 A1 Oct. 4, 2012

Related U.S. Application Data

(60) Continuation of application No. 12/044,968, filed on Mar. 8, 2008, now Pat. No. 8,125,381, which is a division of application No. 10/530,170, filed as application No. PCT/US03/31684 on Oct. 4, 2003, now Pat. No. 7,463,189.

(60) Provisional application No. 60/416,367, filed on Oct. 4, 2002.

(51) Int. Cl.
*G01S 19/27* (2010.01)

(52) U.S. Cl.
CPC ..................................... *G01S 19/27* (2013.01)
USPC .................................................... 342/357.66

(58) Field of Classification Search
CPC ...................................................... G01S 19/27
USPC .................................................... 342/357.66
See application file for complete search history.

(56) References Cited

U.S. PATENT DOCUMENTS

| | | | |
|---|---|---|---|
| 4,445,118 A | 4/1984 | Taylor et al. | |
| 4,453,165 A | 6/1984 | Maine | |
| 4,972,431 A | 11/1990 | Keegan | |
| 5,157,697 A | 10/1992 | Anvari et al. | |

(Continued)

FOREIGN PATENT DOCUMENTS

| | | |
|---|---|---|
| EP | 0186318 | 11/2001 |
| FI | 110293 | 10/2002 |

(Continued)

OTHER PUBLICATIONS

U.S. Statutory Invention Registration, Reg. No. H2155, published May 2, 2006, inventors Tsui et al.

(Continued)

*Primary Examiner* — Gregory C Issing

(57) ABSTRACT

A method, device and system for determining a receiver location using weak signal satellite transmissions. The invention involves a sequence of exchanges between an aiding source and a receiver that serve to provide aiding information to the receiver so that the receiver's location may be determined in the presence of weak satellite transmissions. With the aiding information, the novel receiver detects, acquires and tracks weak satellite signals and computes position solutions from calculated pseudo ranges despite the inability to extract time synchronization date from the weak satellite signals. The invention includes as features, methods and apparatus for the calibration of a local oscillator, the cancellation of cross correlations, a Doppler location scheme, an ensemble averaging scheme, the calculation of almanac aiding from a table of orbit coefficients, absolute time determination, and a modified search engine.

11 Claims, 10 Drawing Sheets

(56) References Cited

U.S. PATENT DOCUMENTS

| | | |
|---|---|---|
| 5,271,034 A | 12/1993 | Abaunza |
| 5,418,538 A | 5/1995 | Lau |
| 5,430,894 A | 7/1995 | Nohara et al. |
| 5,459,473 A | 10/1995 | Dempster et al. |
| 5,535,237 A | 7/1996 | LaPadula, III et al. |
| 5,612,978 A | 3/1997 | Blanchard et al. |
| 5,663,734 A | 9/1997 | Krasner |
| 5,717,403 A | 2/1998 | Nelson et al. |
| 5,721,694 A | 2/1998 | Graupe |
| 5,737,715 A | 4/1998 | Deaton et al. |
| 5,781,156 A | 7/1998 | Krasner |
| 5,841,396 A | 11/1998 | Krasner |
| 5,844,521 A | 12/1998 | Stephens et al. |
| 5,872,540 A | 2/1999 | Casabona et al. |
| 5,874,914 A | 2/1999 | Krasner |
| 5,917,444 A | 6/1999 | Loomis et al. |
| 5,945,944 A | 8/1999 | Krasner |
| 6,016,117 A * | 1/2000 | Nelson, Jr. ................ 342/352 |
| 6,016,119 A | 1/2000 | Krasner |
| 6,023,242 A | 2/2000 | Dixon |
| 6,052,421 A | 4/2000 | Richardson et al. |
| 6,067,045 A | 5/2000 | Castelloe et al. |
| 6,078,284 A | 6/2000 | Levanon |
| 6,091,785 A | 7/2000 | Lennen |
| 6,160,509 A | 12/2000 | Graziani et al. |
| 6,175,602 B1 | 1/2001 | Gustafsson et al. |
| 6,204,808 B1 | 3/2001 | Bloebaum et al. |
| 6,208,292 B1 | 3/2001 | Sih et al. |
| 6,211,819 B1 | 4/2001 | King et al. |
| 6,222,483 B1 | 4/2001 | Twitchell et al. |
| 6,229,998 B1 | 5/2001 | Hamdy et al. |
| 6,236,354 B1 | 5/2001 | Krasner |
| 6,282,231 B1 | 8/2001 | Norman et al. |
| 6,292,520 B1 | 9/2001 | Tsukahara |
| 6,317,077 B1 | 11/2001 | Soleimani et al. |
| 6,323,803 B1 * | 11/2001 | Jolley et al. ............ 342/357.42 |
| 6,369,754 B1 | 4/2002 | Levanon |
| 6,408,178 B1 | 6/2002 | Wickstrom et al. |
| 6,473,694 B1 | 10/2002 | Akopian et al. |
| 6,567,712 B1 * | 5/2003 | Rog et al. ..................... 700/56 |
| 6,633,255 B2 | 10/2003 | Krasner |
| 6,642,884 B2 | 11/2003 | Bryant et al. |
| 6,650,282 B2 | 11/2003 | Martikka |
| 6,651,000 B2 | 11/2003 | van Diggelen et al. |
| 6,664,923 B1 | 12/2003 | Ford |
| 6,701,253 B2 * | 3/2004 | Edwards et al. ............ 701/470 |
| 6,778,885 B2 | 8/2004 | Agashe et al. |
| 6,788,251 B2 * | 9/2004 | Townsend et al. ........... 342/384 |
| 7,010,307 B2 | 3/2006 | Abraham |
| 7,027,486 B2 | 4/2006 | Sullivan |
| 7,133,772 B2 | 11/2006 | van Diggelen |
| 7,463,189 B2 | 12/2008 | Bryant et al. |
| 2001/0020912 A1 | 9/2001 | Naruse et al. |
| 2001/0034210 A1 | 10/2001 | Nir et al. |
| 2001/0046256 A1 | 11/2001 | Norman et al. |
| 2002/0163467 A1 | 11/2002 | Martikka |
| 2003/0090413 A1 | 5/2003 | Syrjarinne et al. |
| 2004/0004570 A1 | 1/2004 | Townsend et al. |
| 2007/0183483 A1 | 8/2007 | Narayan et al. |
| 2009/0102709 A1 | 4/2009 | Bryant et al. |

FOREIGN PATENT DOCUMENTS

| | | |
|---|---|---|
| GB | 2222040 | 2/1990 |
| WO | 0197407 | 12/2001 |
| WO | 0223213 | 3/2002 |

OTHER PUBLICATIONS

Supplementary European Search Report EP 03 77 0667 dated Sep. 15, 2008.

International Search Report PCT/US03/31684 dated Nov. 3, 2004.

* cited by examiner

SATELLITE-BASED POSITIONING SYSTEM IMPROVEMENT

This application is a continuation of application Ser. No. 12/044,968 filed Mar. 8, 2008 now U.S. Pat. No. 8,125,381, now allowed, which is a divisional of application Ser. No. 10/530,170 filed Sep. 19, 2005, now U.S. Pat. No. 7,463,189, which was a National Stage Entry of PCT application number PCT/US03/31684 filed Oct. 4, 2003, which claims the priority filing date of U.S. Provisional Application Ser. No. 60/416,367 filed on Oct. 4, 2002.

FIELD OF THE INVENTION

This invention relates to the design of receivers employed in satellite-based positioning systems (SPS) such as the US Navstar Global Positioning System (GPS), the Russian Global Navigation Satellite System (GLONASS) and the European Galileo system. More specifically, the invention relates to methods, devices and systems for determining a receiver location using weak signal satellite transmissions.

BACKGROUND OF THE INVENTION

Satellite based positioning systems operate by utilizing constellations of satellites which transmit to earth continuous direct sequence spread spectrum signals. Receivers within receiving range of these satellites intercept these signals which carry data (navigation messages) modulated onto a spread spectrum carrier. This data provides the precise time of transmission at certain instants in the signal along with orbital parameters (e.g., precise ephemeris data and less precise almanac data in the case of GPS) for the satellites themselves. By estimating the time of flight of the signal from each of four satellites to the receiver and computing the position of the satellites at the times of transmission corresponding to the estimated times of flight it is possible to determine the precise location of the receiver's antenna.

In a conventional SPS receiver, the process by which this is done involves estimating pseudoranges of at least 4 satellites and then computing from these the precise location and clock error of the receiver. Each pseudorange is computed as the time of flight from one satellite to the receiver multiplied by the speed of light and is thus an estimate of the distance or 'range' between the satellite and the receiver. The time of flight is estimated as the difference between the time of transmission determined from the navigation message and the time of receipt as determined using a clock in the receiver. Since the receiver's clock will inevitably have a different present time when compared to the clock of the satellites, the four range computations will have a common error. The common error is the error in the receiver's clock multiplied by the speed of light.

By using at least 4 satellites it is possible to solve a set of equations to determine both the receiver clock error and the location of the antenna. If only 3 measurements are available it is still possible to determine the location and clock error provided at least one of the receiver's coordinates is already known. Often, this situation can be approximated by estimating the altitude of the antenna.

The signals from the satellites consist of a carrier signal which is biphase modulated by a pseudo-random binary spreading code at a relatively high "chipping" rate (e.g., 1.023 MHz) and then biphase modulated by the binary navigation message at a low data rate (e.g., 50 Hz). The carrier to noise ratio is typically very low (e.g., 31 dBHz to 51 dBHz) at the earth's surface for a receiver with unobstructed line of sight to the satellite from its antenna. However, it is sufficient to permit the signals to be detected, acquired and tracked using conventional phase-locked loop and delay-locked loop techniques and for the data to be extracted.

The process of tracking the code of a signal in a conventional SPS receiver involves the use of a hardware code generator and signal mixer. When the locally generated code is exactly aligned with that of the incoming signal, the output from the mixer contains no code modulation at all. Hence the bandwidth of the signal is much less and it can be filtered to greatly increase the signal to noise ratio. This is usually done using a decimation filter such that the correlator output sampling rate is much lower than the input sampling rate (e.g., 1 kHz at the output compared to 1.3 MHz at the input).

Also, in the case of GPS, the precise time of transmission of this signal corresponding to any given instant at the receiver can be determined by latching the state of the code generator to get the code phase and by counting the code epochs within each bit of the data and by counting the bits within each word of the navigation message and by counting the words within each subframe of the message and by extracting and decoding the times of transmission corresponding to the subframe boundaries. A similar scheme can be used for any SPS.

However, traditional SPS receivers can suffer from troublesome lapses in position identification in the presence of weakened transmission signals. When the direct line of sight between the antenna and the satellites is obstructed, signals may be severely attenuated when they reach the antenna. Conventional techniques can not be used to detect, acquire and track these signals. Moreover, under these circumstances even if the signal could be detected, the carrier-to-noise ratio of a GPS signal, for example, may be as low as or lower than 24 dBHz and as such it is not possible to extract the data from the signals.

Prior art devices have attempted to minimize or overcome these shortcomings through the use of aiding information. In such schemes, additional information is externally supplied to the SPS receivers through various secondary transmission sources to balance the shortfall of information resulting from the attenuated signals. Examples of such devices are taught in the patents to Taylor et al. (U.S. Pat. No. 4,445,118) (aided by satellite almanac data); Lau (U.S. Pat. No. 5,418,538) (aided by differential satellite positioning information and ephemerides); Krasner (U.S. Pat. No. 5,663,734) (aided by transmission of Doppler frequency shifts); Krasner (U.S. Pat. No. 5,781,156) (aided by transmission of Doppler frequency shifts); Krasner (U.S. Pat. No. 5,874,914) (aided by Doppler, initialization and pseudorange data) Krasner (U.S. Pat. No. 5,841,396) (aided by satellite almanac data); Loomis, et al. (U.S. Pat. No. 5,917,444) (aided by selected satellite ephemerides, almanac, ionosphere, time, pseudorange corrections, satellite index and/or code phase attributes); Krasner (U.S. Pat. No. 5,945,944) (aided by timing data); Krasner (U.S. Pat. No. 6,016,119) (aided by retransmission of data from satellite signal)

However, aiding information requires additional transmission capabilities. For example, aiding information may be sent to the SPS receiver using additional satellite transmitters or wireless telephone systems. As such, it is a significant advantage to reduce the quantum of aiding information supplied to limit the use of such additional resources. For example, when the voice path of a wireless communication network is being used to communicate the aiding information, the voice communication will be interrupted by the aiding message. The aiding messages must therefore be as short as possible in order to limit the voice interruptions to tolerable durations and frequencies. Also, no matter how the aiding data is communicated, its communication will delay the operation of the receiver. In many applications the location data is needed promptly and therefore any delay must be minimized.

BRIEF DESCRIPTION OF THE INVENTION

The present invention is an improvement on the invention disclosed in International Patent Application PCT/AU01/00519.

Calibration of Local Oscillator

In many assisted GPS applications rapid acquisition of satellite signals is a key requirement. Acquisition is delayed because of drift of the reference oscillator in the receiving unit. The relative velocity along the line of sight from the receiver to the satellite induces a Doppler shift in the frequency of received signal. The Doppler shift contains useful information on the velocity of the receiver antenna, but the presence of the Doppler shift necessitates a frequency search that increases the time for acquisition. Reference oscillator drift is a major contributor to lengthening acquisition time as it causes the "Doppler" frequency search to be increased to allow for reference oscillator drift. By utilizing the precise signal framing of a digital communications link, the invention calibrates a local oscillator and thus reduce the effect of drift. This is accomplished by counting local oscillator cycles and fractions thereof over a period precisely determined by a number of signal framing intervals. Once the calibration offset is determined it is used as a correction by the GPS receiver firmware when performing acquisition searches or it can be used to correct the oscillator frequency so as to minimize the offset.

Cancellation of Cross Correlation

Another aspect of the invention is the reduction of cross correlations between weak and strong signals experienced at correlator outputs. These cross-correlations are inherent limitations of the GPS C/A Code structure. The cross correlations between codes at certain code and Doppler offsets are only 20 dB between the peak of the autocorrelation main lobe. At the correlator output these cross-correlations are indistinguishable from correlations with the locally generated jreplica of the weak signal being sought. Reducing the level of cross-correlations caused by a strong signal will reduce its jamming effect on weaker signals. In this way the usable dynamic range is increased to permit weak signals to be acquired, tracked and used in the presence of strong ones. At least 3 satellites are needed to make a 2D fix and 4 satellites are require to make a 3D fix. Furthermore, more than the minimum number may be required to obtain a low enough Dilution Of Precision to permit an accurate fix to be made. Hence the ability to use more of the signals present is an advantage. In urban canyons this advantage will be distinct in that there are often only one or two strong signals present and these jam all of the weaker ones. The biggest problem with the concept of canceling the strong signals is that the signals are represented with very low precision at the input to a correlator and, hence, any scaling of the signal can only be extremely crudely performed. This threatens the viability of the concept. The present invention provides allows the scaling to be performed at a point where the signal is represented by 10 bit samples and scaling is much more feasible.

Doppler Location Scheme

Another aspect of the invention deals with the problem that in a weak signal environment, it is not possible to resolve code phase ambiguity without knowing the GPS receiver's initial position to within 150 km. The 150 km is the distance a satellite signal would travel in the time occupied by one half of a code epoch. The invention provides a method for computing the initial position autonomously without requiring prior knowledge of the location by computing it from measured satellite Doppler differences. Using differences to perform the calculation ensures that any dependence on the current local oscillator offset is removed from the calculation.

Ensemble Averaging Scheme

A still further aspect of the invention concerns the limitations on sensitivity caused by limitation in performing Fourier transforms. The transform involves accumulating values in frequency bins. Previous algorithms are limited in sensitivity because the reduction of binwidth is offset by squaring losses. This causes growth of the FFT (fast Fourier transform) size to impractical lengths. To overcome this problem a spectral averaging algorithm is employed for integration periods beyond 160 ms (FFT length of 128). To avoid excessive memory usage for storing FFT arrays, the invention operates in the fashion of a moving average by filtering the squared magnitudes of the FFT bins in the same fashion as for the autoconvolutions when acquiring.

Calculation of Almanac Aiding from Table of Orbit Coefficients

A still further aspect of the invention reduces the traffic from the receiver to the aiding source. In particular, an alternative is provided to having the receiver acquire its own almanac data and requesting augmentation coefficients for a specific Issue Of Almanac as aiding information. Instead the invention hardcodes orbital coefficients into a lookup table and the aiding information is provided as broadcasts at regular intervals.

Absolute Time Determination

Another aspect of the invention concerns the problem of extracting data from the GPS signal when there is a poor signal to noise ratio. Often the output of a weak signal GPS receiver is limited to code phases for each satellite rather than a full time-of-transmit (pseudorange). However a full time-of-transmit is obtainable from a partial code phase provided that a reference time stamp for the observation is available, as well as an estimate of the users location. The estimate of the users location can be used to calculate a nominal time of flight for each satellite provided that its uncertainty is less than 150 km (0.5 ms), while the reference time stamp is used to convert the time-of-receipt into an estimated satellite time-of-transmit. The code phase is then used to refine the time-of-transmit estimate into an ambiguity resolved time-of-transmit. This ambiguity resolved time-of-transmit will be consistent with the true user position and hence can be used to calculate the true user position.

Modified Search Engine

A still further aspect of the invention is a modified search engine. Modern GPS receivers often incorporate massively parallel correlation hardware to speed the acquisition process by concurrently searching across a broad range of codephases and/or Doppler frequencies. Such hardware are sometimes referred to as search engines. The signal processing algorithms utilitzed in the invention can be incorporated into a modified search engine to achieve even faster searching by reducing the length of integration period required.

An object of the present invention is to provide a satellite-based positioning system receiver for weak signal operation have each of the advantages just described.

Consistent with these objectives, a device made in accordance with this invention utilizes a novel signal processing scheme for detecting, acquiring and tracking attenuated satellite signals, such as those that might be received at an indoor location, and computes location solutions. The scheme makes novel use of attenuated satellite signals and minimal externally-supplied aiding information.

BRIEF DESCRIPTION OF THE DRAWINGS

This invention is illustrated by means of the accompanying drawings. However, these figures represent examples of the invention and do not serve to limit its applicability.

DETAILED DESCRIPTION OF EMBODIMENTS OF THE INVENTION

This invention relates to refinements and extensions to a commonly owned invention disclosed in U.S. Pat. No. 5,459,473. Accordingly, the foregoing U.S. patent is hereby incorporated by reference.

Aiding Source/Receiver Interaction

Figure 1:
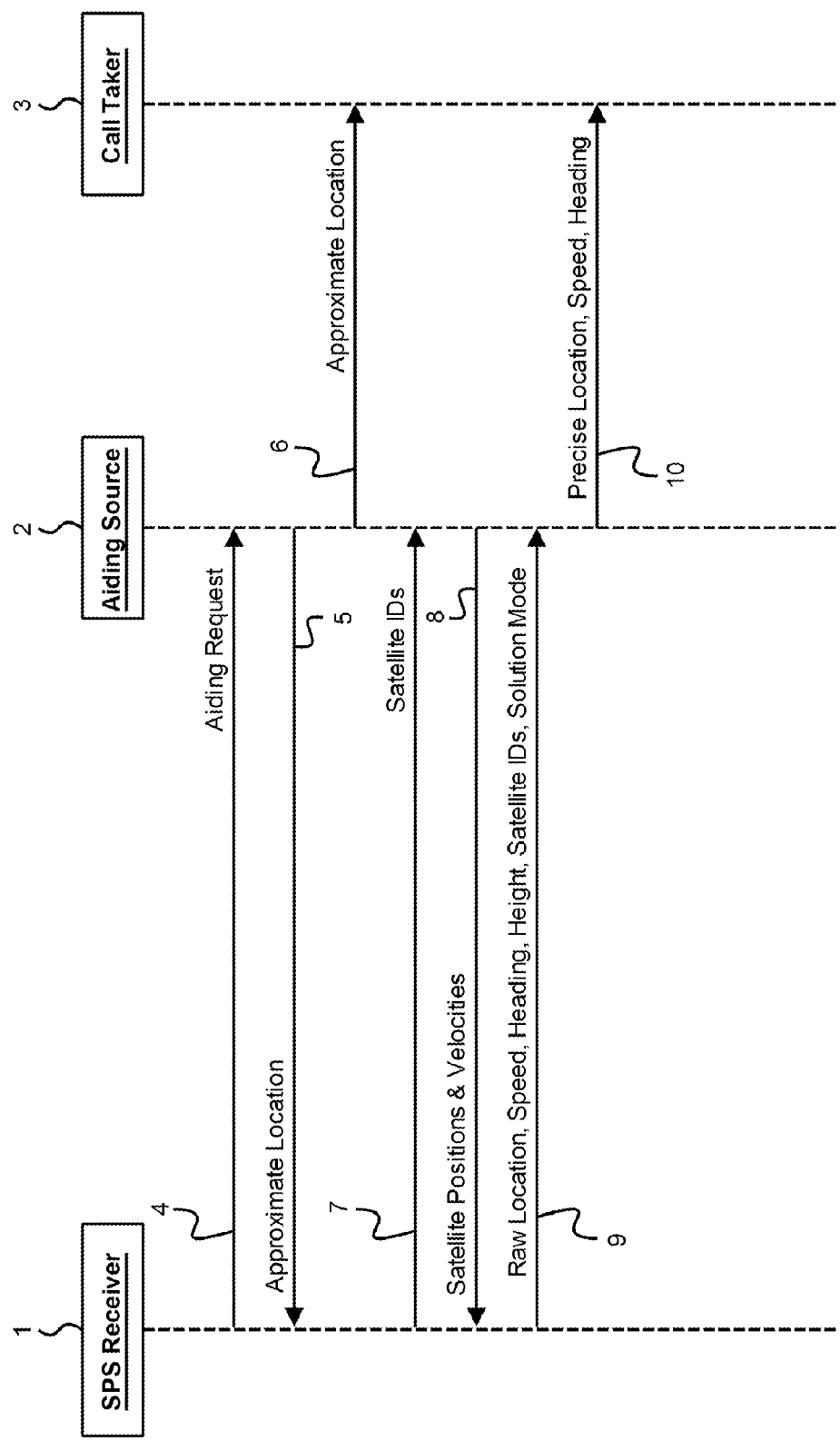
FIG. 1 is a sequence diagram describing the interactions between an aiding source, a call taker and a handset with an integrated SPS receiver according to one embodiment of this invention.

As previously described, the aiding data used in accordance with the present invention may be limited to information that includes an approximate location for an SPS receiver and the positions and velocities of a specific set of satellites. This information is determined and provided through a request/response sequence. A model of one embodiment of such an exchange in accordance with the present invention is depicted in FIG. 1.

A typical exchange might involve an SPS Receiver 1, an Aiding Source 2 and a Call Taker 3. For instance, the SPS Receiver 1 might be a GPS receiver embedded in or co-located with a wireless telephone or other handset. The Aiding Source 2 may be located at a call center or cell site or elsewhere in the wireless network such that the aiding data is transmitted via a wireless communication link to the handset. The Call Taker 3 may also be located at the call center or other location accessible from the wireless network. The ultimate user of the location data may be either the Call Taker 3 or the user accompanying the SPS Receiver 1. Other forms of transmission between the SPS Receiver 1, Aiding Source 2, and the Call Taker 3 may be utilized without departing from the objectives of the present invention.

To begin the exchange, the SPS Receiver 1 sends a First Aiding Request 4 to the Aiding Source 2. This would typically occur upon activation of the SPS Receiver 1 but may occur at other times as well. In response, the Aiding Source 2, sends a First Aiding Response 5 which contains the approximate location of the SPS Receiver 1. Preferably, the approximate location of the SPS Receiver 1 is accurate to better than one half of a code epoch of a satellite signal multiplied by the speed of light or about 150 km in the case of GPS. The approximate location may also be sent to the Call Taker 3 in a First Aiding Report 6.

Doppler Location Scheme Alternative

In a weak signal environment, it is not possible to resolve code phase ambiguity without knowing the GPS receiver's initial position to within 150 km. A method for computing the initial position autonomously without requiring prior knowledge of the location is to compute it from measured satellite Doppler differences. Using differences to perform the calculation ensures that any dependence on the current local oscillator offset is removed from the calculation. A Doppler positioning algorithm that implements this scheme is the following, which would be executed by microprocessor 20 of FIG. 3:

1. For each input observation made by the GPS receiver apply the space vehicle (SV) clock corrections to both the satellite time of transmits ('Toti') and the satellite Doppler frequencies.

2. For each satellite 'i' calculate satellite position Xi (Xi,Yi,Zi) at the corrected satellite time of transmit 'Toti'.

3. Calculate the average satellite position by taking the vector mean of the calculated satellite positions. Convert the vector mean to a unit vector and then scale by the radius of the earth. This provides an initial estimate for the user position Xu (Xu,Yu,Zu). The user's local velocity is assumed to be zero throughout the entire process, so (XuDot,YuDot,ZuDot) is (0,0,0).

4. Iterate through the following steps 5 to 10 until the residual error is sufficiently small (say less than 100 m).

5. Using the current estimate of the user position and user velocity (zero), calculate the range 'Ri' and range-rate 'RRi' vectors to the satellite 'i'. Note that these will change at each iteration as the estimate of the user position Xu converges to the true position.

6. Using the range vector 'Ri' calculate the line-of-sight vector 'LOSi' (the unit range-vector). Calculate the projection of the range-rate vector onto the line of sight vector (RRi·LOSi) thereby determining an estimate of the predicted satellite range-rate. Finally calculate a range-rate prediction vector 'yh' as the vector of differences between the first satellite range rate and all remaining range-rates.

7. Using the measured satellite observations, calculate a measured range-rate vector 'y' as the differences between the first measured satellite range-rate (Doppler frequency scaled to same units as predictions above).

8. Using the satellite line-of-sight vectors calculate a measurement matrix 'M' of line of sight vector differences between the first satellite and all remaining satellites. Each row in the matrix corresponds to the difference between the first satellite LOS vector and the one of the remaining satellite LOS vectors.

9. Calculate the pseudo-inverse of the M matrix 'Mpi'.

10. Correct the current estimate of the user position by calculating dx=Mpi*(y−yh) and Xu=Xy+dx. When the magnitude of the correction 'dx' is less than a sufficiently small threshold (say less than 100 m) then terminate the iteration process.

Absolute Time Determination

Related to the Doppler position process is the following aspect of the invention. One of the limitations of assisted GPS in a weak signal environment is the inability to extract data from the GPS signal due to the poor signal to noise ratio. This means that the output of a weak signal GPS receiver is often limited to code phases for each satellite rather than a full time-of-transmit (pseudorange). However a full time-of-transmit can be obtained from a partial code phase provided that a reference time stamp for the observation is available, as well as an estimate of the users location.

The estimate of the users location can be used to calculate a nominal time of flight for each satellite provided that its uncertainty is less than 150 km (0.5 ms), while the reference time stamp is used to convert the time-of-receipt into an estimated satellite time-of-transmit. The code phase is then used to refine the time-of-transmit estimate into an ambiguity resolved time-of-transmit. This ambiguity resolved time-of-transmit will be consistent with the true user position and hence can be used to calculate the true user position.

For the above process to provide acceptable positional accuracy it is necessary that the reference time-stamp have an error of less than 10 ms. The algorithm that is provided below provides a means by which any error in the estimated time-of-receipt can be calculated providing that at least one additional satellite is available for use. This algorithm is similar in concept to the Doppler position process except that full or ambiguity resolved time-of-transmits are employed.

The algorithm requires an additional redundant satellite because attempting to estimate the time-of-receipt error is equivalent to introducing an additional degree of freedom or an additional unknown and hence an additional linearly independent observation is required for this to be estimated. If only 4 observations are available then there will only be a single position solution to the problem regardless of the time-of-receipt and the time-of-receipt error will always be calculated as zero.

The algorithm is the following:

1. For each raw input observation from satellite i, correct the satellite time-of-transmit Toti for space vehicle (SV) clock corrections.
2. For each satellite i calculate the satellite position vector Xi (Xi,Yi,Zi) and satellite velocity vector XiDot (XiDot,YiDot,ZiDot) at the corrected Toti. The relativistic corrections for each satellite can also be calculated at this stage.
3. Apply relativistic corrections to the corrected Tot's and recalculate SV position and velocity vectors.
4. Calculate a starting point for the user position Xu (Xu,Yu,Zu) by taking the mean satellite position, converting it to a unit vector and scaling it up by the radius of the earth.
5. Iterate through the following steps 6 to 19 until the residual position error is sufficiently small (say less than 100 m) and the residual time-of-receipt estimate error is also sufficiently small (say less than 10 ms).
6. For each raw input observation from satellite i, correct the satellite time-of-transmit Toti for space vehicle (SV) clock corrections. Also apply relativistic corrections. (i.e. Steps (1) and (3)).
7. Using the corrected Toti's for each satellite, recalculate the satellite position Xi and velocity XiDot vectors.
8. Using the most recent user position Xu recalculate the satellite range Ri and range-rate RRi vectors. Corrections for earth rotation are also included within the range and range-rate vectors.
9. An optional step at this point is to is to apply additional corrections to the measured observations that take into account propagation delay effects caused by the ionosphere and troposphere.
10. Using the corrected satellite observations produce a vector yd of time-of-transmit (or pseudorange) differences scaled to units of meters. The differences are taken between the first Tot and each subsequent Tot.
11. Using the calculated satellite range vectors calculate a vector of range difference predictions (in units of meters) ydh for each satellite. The differences are taken between the first range prediction and each subsequent range prediction.
12. Calculate a measurement (attitude) matrix M, where each row in the matrix is the difference between the first LOS vector and each subsequent LOS vector. Calculate the pseudo-inverse Mpi of the measurement matrix M.
13. Calculate the correction to the user position Xu as dx=Mpi*(yd−ydh).
14. If the number of algorithm iterations exceeds 3 iterations then include the following additional steps 15 to 19.
15. Recalculate the satellite range Ri and range-rate RRi vectors using the new estimate for the user position Xu (calculated in step 13).
16. Using the corrected satellite observations produce a vector y of satellite pseudoranges scaled to units of meters. This is similar to step (10) except that the vector y is a vector of full pseudoranges rather than pseudorange differences. Note that this calculation requires an estimate of the time-of-receipt which could contain an error that can be solved for.
17. Using the calculated satellite range vectors calculate a vector of range predictions (in units of meters) yh for each satellite. This is similar to step (11) except that the vector yh is a vector of full pseudorange predictions.
18. Calculate a $2^{nd}$ measurement matrix M1 consisting of 2 rows and Nobs columns, where Nobs is the number of satellite observations. The $1^{st}$ column contains the value c, where c is the speed of light in meters per second. The second column contains estimate of the satellite range-rate in units of meters per second, where the satellite range-rate is calculated as the projection of the satellite range-rate vector onto the line-of-sight vector.
19. Calculate a dt vector as dt=pseudoinverse(M1)*(y−yh). The second element of dt is then an estimate of the time-of-receipt error given the value of the time-of-receipt used to calculate the pseudorange and pseudorange estimates. This time can then be used to correct the time-of-receipt of the raw observation and the procedure repeated.

Further Aiding Source/Receiver Interaction

With the approximate location and previously stored almanac data, the SPS Receiver 1 performs its correlation search to acquire satellite signals. The almanac data and the approximate location help to constrain the initial search once at least one satellite has been acquired. Upon acquisition, the SPS Receiver 1 sends a Second Aiding Request 7 to the Aiding Source 2. The Second Aiding Request 7 includes information for identifying the specific set of satellites used by the SPS Receiver 1 in determining pseudorange differences. In response, the Aiding Source 2 determines the precise positions and velocities of the identified set of satellites from ephemeris data for the satellites. The determined positions and velocities are then sent to the SPS Receiver 1 in a Second Aiding Response 8. Since this elapsed time is known and assuming that the latency between transmission and reception of the request for aiding can be determined it is possible for the aiding source to determine the time of reception of the satellite signals to within a few tens of milliseconds.

Therefore, under this scheme since the Aiding Source 2 provides precise satellite positions and velocities, the Aiding Source 2 rather than the SPS Receiver 1 needs to be able to determine specific time synchronization data from the satellite signals and needs to maintain or acquire ephemeris data. Moreover, in order to ensure that the satellite positions are accurate when received by the SPS Receiver 1 from Aiding Source 2, the latency period for the communication between the two must be within a few tens of milliseconds. This will ensure a limitation on the error in the computed satellite locations to a few meters. To this end, in the preferred embodiment, the Second Aiding Request 7 occurs at a known elapsed time from the instant when the code phases of the satellite signals latch. Since this elapsed time is known and assuming that the latency between transmission and reception of the request for aiding can be determined it is possible for the Aiding Source 2 to determine the time of reception of the satellite signals to within a few tens of milliseconds.

After receiving the satellite positions and velocities and using pseudorange and range rate differences, the SPS Receiver 1 then computes a Position and Velocity (PV) solution to determine its precise location, speed, heading, etc. After such determination, the SPS Receiver 1 then sends a Receiver Report 9 to the Aiding Source 2 which includes the raw location, speed, heading, height, satellite identifications and the solution mode used by it (i.e. 3D or 2D with altitude aiding).

Upon receipt of this later information, the Aiding Source 2 may take further action. For example, the Aiding Source 2 may use the known satellite set and times of transmission, select differential pseudorange corrections (obtained by any available means) and then compute a corresponding location correction consistent with the reported mode of solution. With this later computation, the Aiding Source 2 may then apply the correction to the location reported by the SPS Receiver to obtain a more current location. This precise location then may be sent to the Call Taker 3 in a Second Aiding Report 10.

As an alternative embodiment of this aforementioned exchange, the SPS Receiver 1 reports the code phase differences to the Aiding Source 2. In this event, the Aiding Source 2 could compute a PV solution for the SPS Receiver 1 using a method like that of the SPS Receiver 1.

As described, the scheme requires the SPS Receiver 1 to compute pseudoranges without the benefit of having actual time synchronization data from the satellite signals. The use of this data is avoided because the code phases of the satellite signals are taken as ambiguous measurements of the differences in the times of transmissions of the satellite signals. This is accomplished by measuring the code phases at the same instant so that there is a common time of receipt. Moreover, the ambiguity resolution needed to convert code phase differences into pseudorange differences is achieved by utilizing the approximate location for the receiver obtained from the Aiding Source 2. When the approximate location is then combined with approximate time from a real time clock (accurate to say 1 minute) and current almanac data (less than about 2 months old in the case of GPS which provides range errors of less than about 30 km), this permits approximate ranges of the satellites to be determined to better than half of a code epoch multiplied by the speed of light which is the ambiguity interval for the code phase differences. By combining the set of approximate ranges and the set of code phases, unambiguous and precise pseudorange differences are derived without the need to synchronize the receiver to better than about one minute.

Furthermore, consistent with the aiding data minimization objective, the SPS Receiver 1 is able to compute PV solutions without the need for being supplied with Doppler information. In traditional devices, such information is used to assist in restricting a carrier frequency search during signal acquisition or to predict changes in satellite range as an alternative to using the satellite ephemeris data. In one embodiment, the SPS Receiver 1 estimates Doppler information using stored current almanac data.

Using this current almanac data, the SPS Receiver 1 estimates the Doppler frequencies of the satellites to an accuracy of better than about 250 Hz for GPS given approximate locations of the satellites known to better than about one hundred kilometers. This is sufficient accuracy to achieve a rapid acquisition provided that the frequency offset of the reference oscillator of the SPS Receiver 1 is known to within a few Hz. To achieve this latter requirement, the reference frequency offset is estimated each time a PV solution is computed and thus it can be tracked. Moreover, to the extent that the reference frequency varies with temperature as well as aging and to the extent that a large change in temperature between PV solutions will lead to a degradation in acquisition performance, the SPS Receiver 1, as described below, utilizes a method that copes with the change and ensures graceful degradation.

To ensure the presence of current almanac data without the use of an Aiding Source 1, the SPS Receiver 1 must be activated often enough and for long enough in the presence of strong signals to keep the data current. In the case of the GPS system, the almanac data must be less than 2 months old to remain current. To meet this goal under GPS, the SPS Receiver 1 must gather approximately 27 sets of orbital coefficients over a period of around 2 months. On average it would take around 20 s plus signal acquisition time to gather one set and it would take around 60 such gatherings to acquire all of the sets. Hence, if the SPS Receiver 1 was activated in the presence of strong signals approximately once per day on average for about 30 s then the stored almanac would remain current.

Calculation of Almanac Aiding from Table of Orbit Coefficients

It is common practice to supply aiding information to a GPS receiver in the form of a full Ephemeris and its time of issue. One possibility is to have the receiver acquire its own Almanac data but Augmentation coefficients are supplied as aiding information. These coefficients permit the location and velocity computed from the Almanac data to be corrected to similar accuracy as provided by the Ephemeris coefficients. One disadvantage of this approach is that the receiver has to indicate the Issue Of Almanac to the aiding source so that the correct aiding data can be supplied.

An alternative to this approach is to hardcode orbital coefficients for a number of the most common satellite orbits into a lookup table in the GPS receiver. The aiding source then supplies aiding to the receiver for a given number of visible satellites in the following form:

Satellite ID

Reference time of week (a required parameter of any orbit model)

Look up number to a table of hard-coded orbital coefficients in the receiver

Corrections to the orbital coefficients and/or additional orbital coefficients and/or corrections to the output after using the orbital coefficients.

Because of the compact nature of this data compared to full Ephemeris data or full Almanac data, it is feasible to structure the aiding in the form of broadcasts transmitted at regular intervals. It would be unnecessary for the receivers to request aiding since they would not need to supply the Issue Of Almanac and this is another reason why broadcast coefficients would be feasible. One advantage of using broadcasts is that this would significantly reduce system data traffic in the direction toward the network base center, call center or wireless web site. Another advantage of the scheme is that the receivers do not need to acquire Almanac data which means that they need not be operated in the open at regular intervals to do so.

Calibration of a Local Oscillator

In many Assisted GPS applications rapid acquisition is a key requirement. Reference oscillator drift is a major contributor to acquisition time as it causes the "Doppler" frequency search to be increased to allow for reference oscillator drift. By utilizing the precise signal framing of a digital communications link, it is possible to calibrate a local oscillator. This can be performed as follows:

| | |
|---|---|
| $f_{LO}$ | Frequency of Local Oscillator in Hz to be corrected. |
| $f_{SF}$ | Frequency of Signal Framing of digital communication link in Hz. |
| $Tol_{Loc}$ | Tolerance of Local Oscillator before Calibration in PPM. |
| $Tol_{SF}$ | Tolerance of Signal Framing of digital communication link in PPM. |
| $Offset_{LO}$ | Offset (in Hz) required to calibrate the Local Oscillator to tolerance $Tol_{LOC}$. |
| P | Period of time (in seconds) over which Local Oscillator clock cycles must be counted in order to calculate $Offset_{LO}$ to $Tol_{LOC}$. |
| $N_{SF}$ | Number of Signal Frames over which Local Oscillator clock cycles must be counted in order to calculate $Offset_{Lo}$ to $Tol_{Loc}$. |
| $N_{LO}$ | Number of Local Oscillator clock cycles counted during P (or $N_{SF}$ Signal Frames). |
| n | 1/n is the fraction of a Local Oscillator cycle able to be measured at the signal framing transitions. |

The scheme involves counting local oscillator cycles and fractions thereof over a period precisely determined by a number of signal framing intervals. The measurement resolution relative to the local oscillator period is a 1/n fraction of the local oscillator period and is easily determined with the presence of any hardware clock whose frequency is approximately n times the local oscillator frequency $f_{LO}$. As an example, the local oscillator may be $f_{LO}=10$ MHz and so the presence of a 50 MHz clock with an accuracy of ½n (just 10% in this case) or better will permit measurement of the local oscillator phase to the nearest 1/n of a cycle at the signal framing transition. The measurement is repeated at a later signal framing transition and the total number of local oscillator cycles and $n^{ths}$ of a cycle is determined. Assuming $Tol_{SF} \ll Tol_{LOC}$, then $$P=10^6/(n \times f_{LO} \times Tol_{LOC})$$

The minimum number of signal framing intervals to be used is given by $$N_{SF}=\text{Roundup}(f_{SF} \times P)$$

where the "Roundup" function provides the next higher whole integer when $(f_{SF} \times P)$ is a non integer so that the correction meets or exceeds the accuracy required.
The actual measurement period is $N_{SF}/f_{SF}$
where $N_{LO}$ cycles (accurate to 1/n of a cycle) are counted.
The more accurate period for a single local oscillator cycle is $N_{SF}/(f_{SF} \times N_{LO})$
The more accurate frequency is thus $(f_{SF} \times N_{LO})/N_{SF}$
The frequency offset of the oscillator is then given by $$Offset_{LO}=f_{LO}-(f_{SF} \times N_{LO})/N_{SF}$$

This calibration offset can be used as a correction by the GPS receiver firmware when performing acquisition searches or it can be used to correct the oscillator frequency so as to minimize the offset.

Weak Signal Acquisition/Tracking in Presence of Jamming Signals

One of the problems associated with the use of weak SPS signals is that any SPS system has a limited dynamic range. In the case of the C/A Code signal of the GPS system, for example, any signal that is weaker by more than about 20 dB than another signal that is also present may be jammed by the stronger signal. There are 2 main effects of this jamming. First, while attempting to acquire the weaker signal using a sufficiently low threshold, the receiver's search sequence will be interrupted by frequent false alarms because the cross-correlations between the strong signal and the code generated in the receiver will be often be above the threshold. Second, although the receiver may be able to acquire and track the weaker signal, it will be susceptible to large measurement errors caused by cross-correlation side lobes from the stronger signal dragging the tracking algorithm away from the true correlation main lobe.

It is highly desirable to avoid the first of these problems and it is essential to avoid the latter problem as it can result in gross positioning errors of up to several kilometers. Thus, the SPS Receiver 1 should attempt to acquire strong signals before attempting to acquire weaker signals. In this regard, FIG. 2 outlines an example procedure for a GPS receiver that ensures that any strong signals are acquired first using a high threshold. A threshold for acquisition of any remaining needed signals will then be set, in the case of GPS, 20 dB below the strongest signal acquired. While the FIG. 2 contains information pertinent to GPS system, its general application would be equally applicable to any other SPS system.

Figure 2:
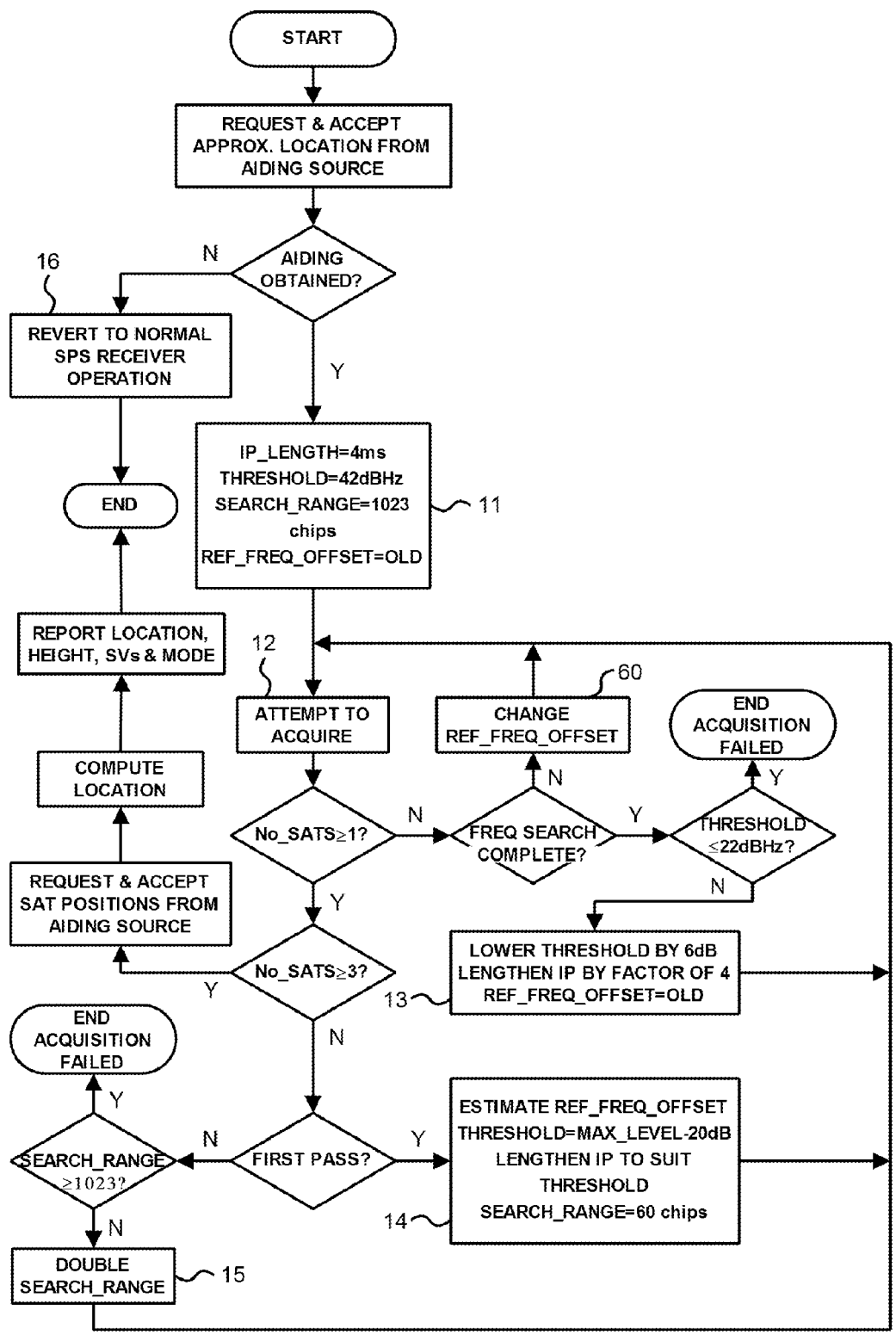
FIG. 2 is a flowchart describing the overall algorithm according to one embodiment of this invention for acquiring satellite signals, measuring code phases, carrier smoothing these measurements, computing pseudorange differences and computing handset location.

Referring to FIG. 2, the device starts with the first request/response exchange in attempt to acquire the SPS Receiver's 1 approximate location from the Aiding Source 2. If the exchange is successful and the approximate location aiding data is received, the device sets its initial search parameters in step 11 with the goal of acquiring the strong signals. The parameters for the search are initially set to a high threshold and with a short integration period adequate for acquisition at the selected threshold. There is no prior knowledge of the code phases of the satellites and therefore the search is unrestricted. The reference frequency offset is assumed to be a prior value that was measured when the receiver was previously active (i.e. "old"). In subsequent step 12, with these parameters, the SPS Receiver 1 uses a multi-channel device to perform a concurrent search for the strong signals of all visible satellites.

In the GPS example, conducting such an unrestricted code search with 1 channel per satellite at 1 chip per integration period using 2 arms per channel with 0.5 chip spacing would take 1023/4=256 integration periods or approximately 1 second. In most cases this would be adequate to acquire any strong signals present.

However, in some instances, the assumed frequency offset of the receiver's reference oscillator may have changed by a larger amount than can be accommodated for by the sampling rate of a correlator's output samples. Thus, if no satellite signals are acquired during an attempt using the assumed reference frequency offset, then the offset would be adjusted in step 60 and the search continued without lowering the threshold. In this way, the offset would be changed systematically to effect a search over the possible frequency range. The systematic search would terminate on the acquisition of one or more satellites at the highest possible threshold.

If no satellite signals were acquired over the possible frequency range then, in step 13, a lower threshold would be set (e.g. 6 dB lower) and a longer integration period would be used (e.g. 4 times as long). The reference frequency offset would be set back to the previously assumed value and the frequency search would be restarted using these parameter values.

In the original search to locate at least one satellite, if any strong signals are acquired and additional signals are still needed, then the measured carrier to noise ratio of the strongest signal acquired would be used to determine both the integration period to be used for a subsequent search in step 14 and the acquisition threshold to be applied during the search. For example, if a signal of greater than 50 dBHz was acquired then the integration period for the subsequent search need not be any more than 32 ms. This is because it is possible to detect signals of 30 dBHz or more with an integration period of 32 ms and the threshold would have to be set at 30 dBHz or higher to avoid the dynamic range problems previously described.

The reference frequency offset would also be estimated using the approximate location of the SPS Receiver 1 together with the almanac data and the measured carrier frequency of the acquired signal. This should obviate the need for further frequency searches.

Since at least one satellite has been acquired, a restricted search regime can be conducted for the remaining satellites using one channel per satellite since the approximate code phase differences between all of the remaining visible satellite signals and the first one can be estimated. If the accuracy of the approximate position estimate is assumed to be $\forall 10$ km then the code phase differences can be estimated to within $\forall 25$, approximately. In the GPS case this would permit all of the remaining satellites to be acquired within $50*0.128$ s or 6.4 s. However, the search could be terminated once sufficient satellites had been acquired to permit the location to be determined.

In the GPS example, assuming that the second search did not fail, the maximum time taken to acquire enough satellites would thus be 1 s for the first search for strong signals plus 4 s for the second search for the first satellite plus 6.4 s for the subsequent search for the remaining satellites. This adds up to 11.4 s. However, typically, acquisition would take less than this (e.g. 1 s+4 s+3.2 s or 8.2 s).

Cancellation of Cross Correlations

Figure 7:
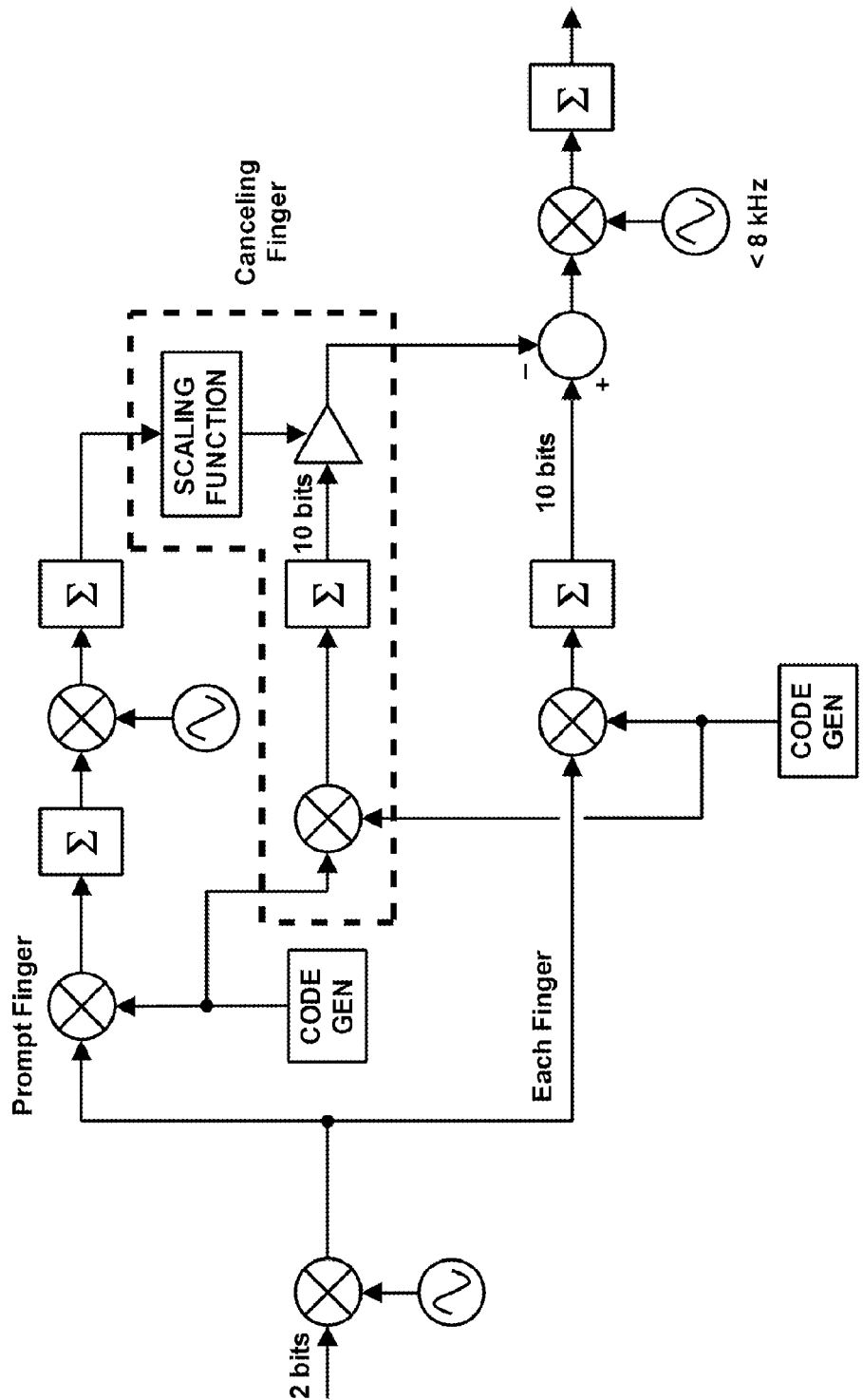
FIG. 7 is a schematic diagram of a canceler integrated into a correlator.

A preferred version of the basic idea of canceling strong signals deals with the problem that the signals are represented with very low precision at the input to a correlator and, hence, any scaling of the signal can only be extremely crudely performed. A preferred variation which allows the scaling to be performed at a point where the signal is represented by a higher number of bit samples, e.g. 10 bit samples and scaling is more feasible is the following:

The concept involves hardware provision in the correlator for cancellation. FIG. 7 is a schematic diagram showing how a canceler may be integrated into a correlator. Each channel or certain channels may be reconfigured to provide a canceling service for others. Alternatively, these canceling elements can be dedicated for the purpose. For each finger of each channel for which canceling is to be performed, a canceling finger is required.

The canceling finger takes one input from the code generator input to the prompt finger of a channel tracking a jamming signal. It takes the second input from the code generator input of the finger for which cancellation is to be performed. By correlating these two signals together, the canceling finger generates an estimate of the cross-correlation between the two C/A-Codes involved.

This is then scaled in proportion to the magnitude of the jamming signal which is obtained from the correlation achieved in the channel tracking the jammer. The result is an estimate of the value of the cross-correlation experienced in the channel for which cancellation is required. Cancellation is then achieved by simply subtracting the estimated cross-correlation value from the correlation measured.

This embodiment has the advantage that the scaling and cancellation are performed at a point where the signal is represented by approximately 10 bits. For this to be so the bandwidth of the signal must have been reduced by a factor of around $2^8$ or 256 times through a process of decimation (integration and down-sampling). It is feasible if all channels have been downconverted identically and therefore the downconversion and code mixing steps can be as shown in FIG. 7. The last channel specific downconversion step is small but large enough to account for the Doppler variation of plus or minus 4 KHz.

Simultaneous Code Phase Determination of Multiple Satellite Signals

Figure 3:
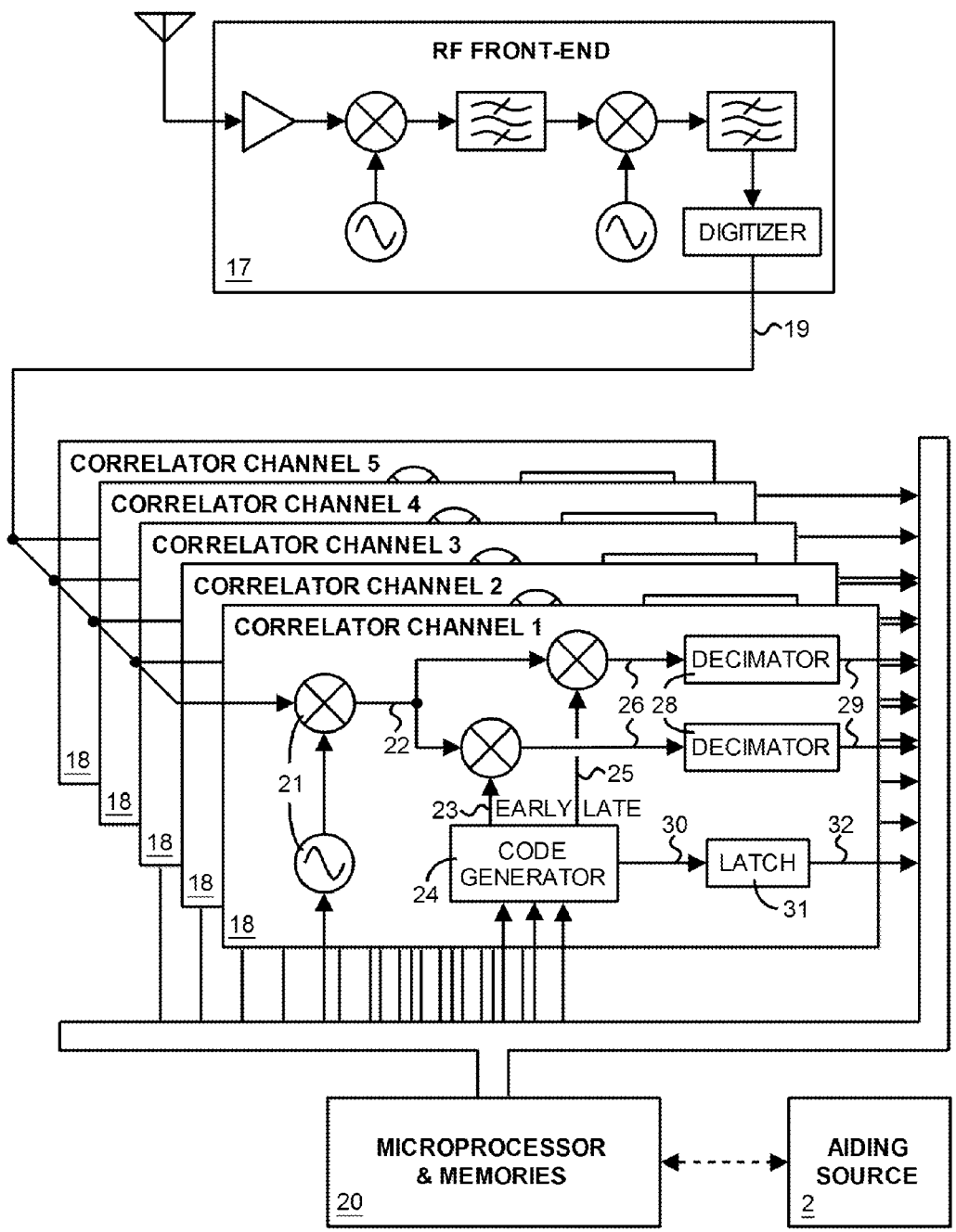
FIG. 3 is a block diagram of a typical SPS receiver according to this invention.

To achieve the aiding scheme as described, an SPS Receiver 1 of the present invention requires the ability to determine the code phases for multiple satellite signals at the same instant. In this regard, FIG. 3 depicts one such SPS Receiver 1. Generally, the SPS Receiver 1 can be broken down into roughly three parts. The device has a front-end circuit 17, three or more correlators 18 and a microprocessor 20 with memory. The following describes the functions of each.

Generally, the front-end circuit 17 serves as the initial signal processor as follows. The front-end circuit 17 amplifies, filters, down converts and digitizes the signal from an antenna so that it is suitable for processing in a digital correlator 18 and such that the signal to noise and signal to interference ratios are minimized subject to economic and practical realization requirements. The front-end output 19 of the front-end circuit could be a complex signal centered at tens of KHz (in the case of GPS) or a real signal centered at around 1.3 MHz or higher. The sampling rate would typically be several MHz and the digitization would be at least 2 bits per sample. In the preferred embodiment an AGC circuit keeps the level of the digitized signal constant. Since the true signals are spread over 2 MHz in the case of GPS and are weak signals in any case, this signal is dominated by noise and the AGC maintains a constant noise level at the output of the front-end.

Hardware correlators 18 each representing a processing channel for a particular satellite signal are used separately to further process the front end output 19 under the control of the microprocessor 20. Within each correlator 18 a further down conversion 21 (quadrature in this case) to nearly DC is performed based on the estimated Doppler offset of a particular satellite signal and the estimated offset of the crystal oscillator reference frequency driving the correlator. Then, the resulting complex down converted signal 22 is mixed with (i.e. multiplied by) a real binary pseudorandom code signal 23 chosen to match that of a particular satellite signal and generated by a code generator 24. The code generator 24, controlled by the microprocessor 20, generates the pseudorandom code signal 23 at a selected rate set to match the estimated signal Doppler offset given the estimated crystal oscillator offset.

The code generator 24 also generates a late pseudorandom code signal 25 that is the same as pseudorandom code signal 23 but at a fixed lag with respect to the former. This late pseudorandom code signal 25 is also mixed with the down converted signal 22. The resulting mixed signals 26 are then separately processed by decimators 28. Decimators 28 low pass anti-alias filter and down sample the mixed signals 26 to a reduced sampling rate. In the case of GPS, the reduced sampling rate is approximately 1 KHz. This sampling rate may be derived from the local code rate such that a single sample will be obtained for each code epoch. However, this is not essential.

When searching in code, the processor 20 either causes the code generator 24 to step instantaneously by the required amount at the start of each integration period or changes the code frequency by a known amount for a precise period of time so as to effect a rapid step in the code lag. This is the preferred embodiment although in an alternative scheme the code frequency may be deliberately offset while searching so that the code slews continuously relative to that of the incoming signal.

When tracking a satellite signal, in this embodiment, the processor 20 constantly adjusts the code lag as just described so as to keep the pseudorandom code signal 23 and late pseudorandom code signal 25 from the code generator 24 running one ahead (early) and one behind (late) the code of the incoming signal. In other embodiments, the code generator 24 may generate a third signal (prompt) that is kept running synchronously with the code of the incoming signal or, indeed, there may be several more signals spanning a lag interval of up to 1 chip (smallest code elements) early and late of the incoming code.

The correlator output samples 29 are read into the processor 20 where they are further processed by a signal processing algorithm described later in this specification to estimate the amplitude, frequency and phase of the carrier signal. Then, if data is to be extracted because the signal is strong enough for that, the phase and frequency are utilized by a separate algorithm that operates on the raw samples to extract the data. Methods for the extraction of this data will be obvious to one skilled in the art.

The frequency of the tracked carrier signals are then used to estimate the Doppler offset of the carriers and the crystal oscillator offset. The former Doppler offset values are subsequently used to estimate the velocity of the receiver (and the vehicle in which it may be traveling).

The amplitude of the early and late correlator output samples 29 represent estimates of the carrier to noise ratio of the satellite signal since the noise level is maintained constant by the AGC of the front-end. When performing a satellite signal search, the amplitudes are compared to a threshold to determine if the signal has been detected. If it has, then an acquisition procedure is commenced. The steps of an appropriate acquisition procedure will be obvious to one skilled in the art.

When tracking, the code phase is adjusted as discussed earlier in order to keep the average amplitudes of the correlator output samples 29 equal to each other. A similar, but more complex algorithm can be applied if 3 or more correlator output samples 29 are present. The nature of these control algorithms will be obvious to one skilled in the art.

At the end of each integration period the code phase 30 for each correlator 18 are simultaneously latched by a latch element 31 within the hardware correlator. The resulting signal represents the code phase measurement 32. These code phase measurements 32 are then made available to the processor 20. The processor 20 then applies a smoothing algorithm to the code phase measurements 32 together with the carrier frequency estimates. This algorithm is used to reduce the random error in the code phase measurements 32 over time by making use of the precision in the carrier frequency estimates to predict the changes in code phase from one integration period to the next. The algorithm also filters the carrier frequency estimates to reduce their random errors. The carrier smoothing algorithm is described later in this document.

After several seconds of smoothing, (five seconds in the preferred embodiment), the carrier smoothed code phase measurements and the filtered carrier frequency estimates are passed to the location solver which estimates the SPS Receiver's 1 location and velocity. The algorithm makes use of precise satellite position data and the approximate location received from the aiding source. This calculation is described in more detail later in this document. The signal processing, carrier smoothing and location solving algorithms are all executed by the processor 20.

Modified Search Engine

Search engines vary from chip to chip. One well known type (Solution 1) involves 12 channels with 20 fingers per channel and these channels can be ganged to provide 240 fingers. In this ganged mode each finger has 8 DFT bins thereby providing the equivalent of 1920 fingers all searching for the one satellite. Another well known type (Solution 2) involves a search engine with approximately 16,000 fingers which can be used to search for up to 8 satellites simultaneously across the full code space but with only one frequency bin. Other types incorporate limited search engine capacity together with correlators.

Figure 8:
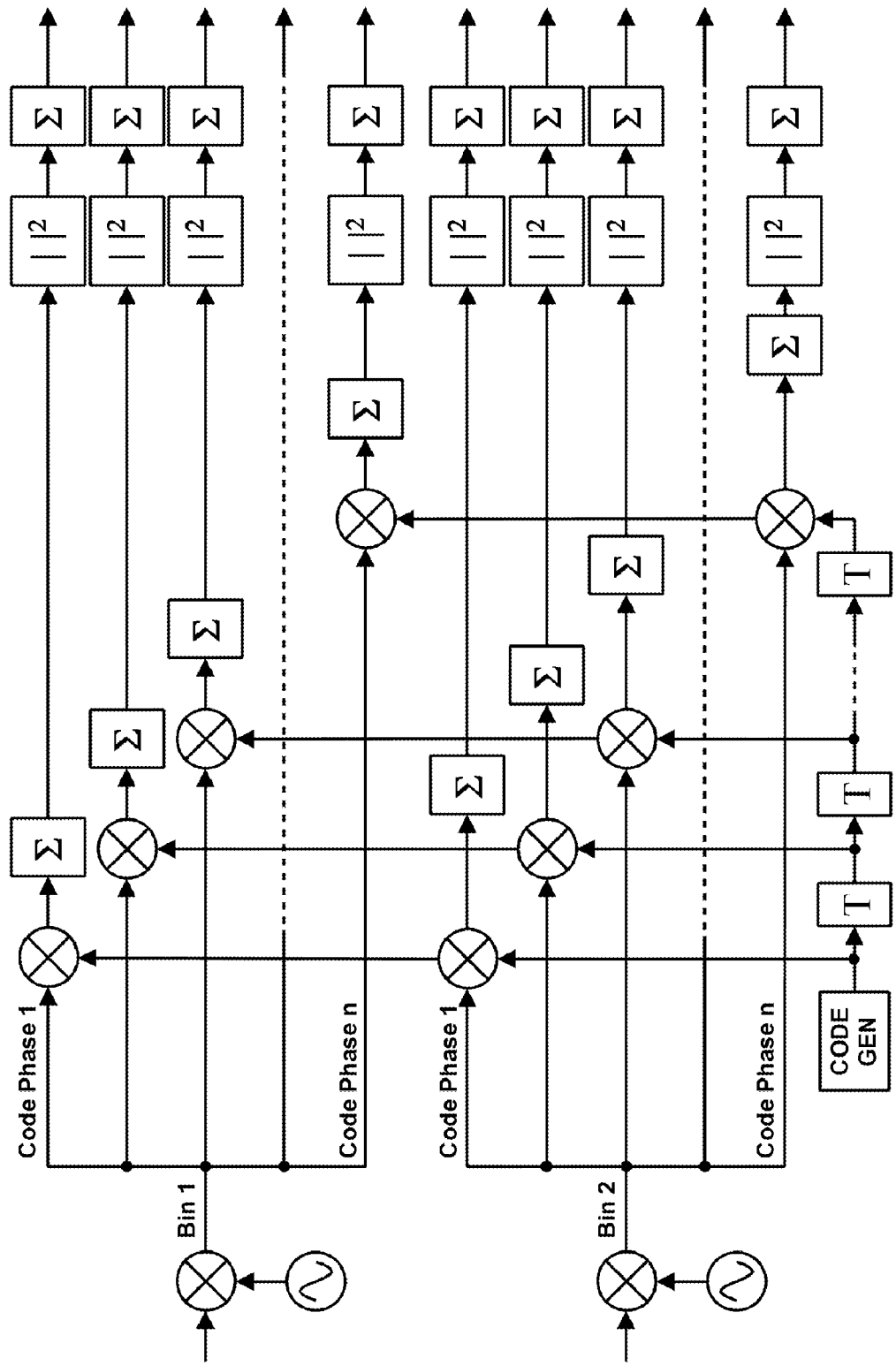
FIG. 8 illustrates a 2 bin search engine architecture.

In all cases the search engine hardware supports coherent integration, usually with variable integration period, followed by non-coherent integration over a variable period. FIG. 8 illustrates a preferred 2 bin search engine architecture. The coherent interval determines the binwidth but it also determines the coherent processing gain. The squaring loss incurred at the end of the non-coherent integration step depends on the signal-to-noise ratio prior to squaring and therefore it is desirable to maximize the coherent interval so as to minimize the squaring loss. However, it is necessary to obtain sufficient bandwidth to cope with residual TCXO error and Doppler error due to initial positioning error. With longer coherent integration periods this may require frequency searching unless multiple frequency bins are employed.

In a wireless location application a minimum of around 200 Hz bandwidth is required to allow for up to 20 km cell radius and 0.1 PPM residual TCXO error after network compensation (if employed).

Since the Solution 2 hardware does not incorporate a correlator it is necessary for all of the satellite search engines to commence simultaneously at the same codephase so that the codephase measurements are meaningful in a relative sense. This rules out sequential frequency searches and thus limits the coherent interval that may be employed to 5 ms so as to provide 200 Hz bandwidth. If only 4 satellites are acquired simultaneously then 2 bins can be produced for each and the coherent interval can be increased to 10 s. However, with the fading typical of weak signal environments, this would not produce good performance.

Where correlators are employed, tracking firmware may be used to track satellite signals following acquisition using the search engine. This provides more freedom in the optimization of the search algorithm. Longer coherent integration periods may be employed because the search may be undertaken sequentially and satellites may be acquired sequentially. Once the first satellite has been acquired the search range may be restricted in code space to reduce acquisition time or the required search engine capacity.

For an architecture like Solution 1 the Search Engine mode is employed for the first satellite after which it is far quicker to use the correlators with acquisition firmware based on the algorithms disclosed in this document to perform in parallel a restricted sequential code search for all of the remaining satellites. The search may be repetitive to allow for fading. Several of the 20 fingers may be used in parallel to speed the search process although the processing load may be prohibitive if more than 6 fingers are used. (The fingers are used in pairs to minimize processing load and to optimize detection performance.)

Searching using conventional correlators with the acquisition algorithms of the invention is a sequential process. However, because the integration periods required for given sensitivity are far less using the processing scheme of the invention than using a search engine, the choice of correlators or Search Engine for acquisition depends on the available search engine capacity. For the first satellite the search engine is invariably quicker. For subsequent satellites it may be quicker to use correlators.

Figure 9:
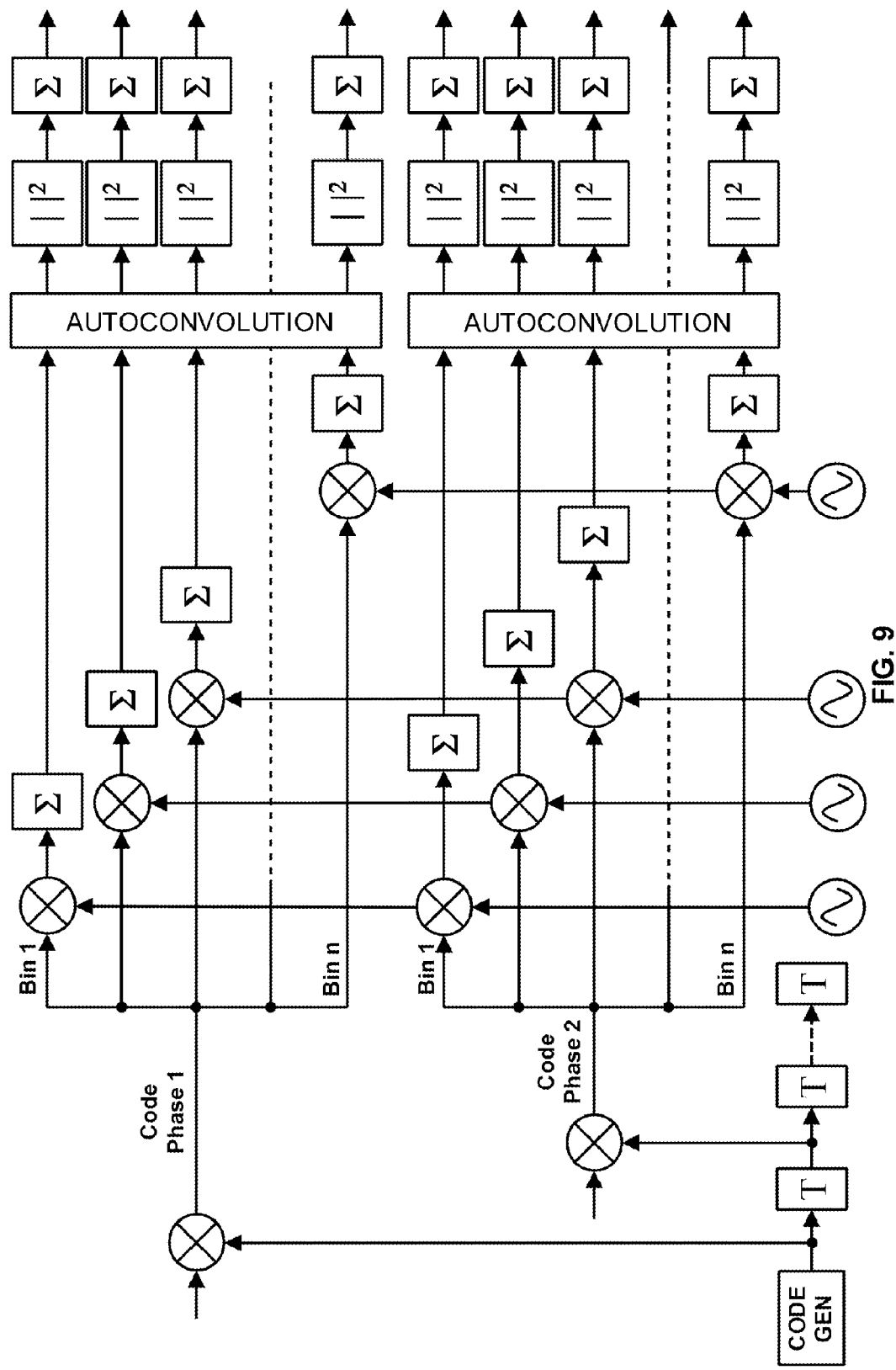
FIG. 9 is a schematic representation of a 2 codephase modified search engine.

A special search engine configuration may be employed to integrate with the processing algorithms of the invention. This allows the search engine to take advantage of the greatly reduced integration periods of the invention at the cost of more frequency bins. The fingers are used in groups of 30 to provide consecutive DFT bins to allow for the data bandwidth and frequency uncertainty with the narrower binwidth corresponding to a coherent integration period of 128 ms. Prior to magnitude squaring, an extra processing block is required but the extra processing capacity required represents an additional overhead of only 10% of the coherent processing capacity requirement. After non-coherent integration the peak bin and adjacent bins are passed to the firmware for additional processing to estimate carrier magnitude and frequency for detection and handover to the correlator. FIG. 9 illustrates the modified search engine architecture.

Using 1 ms minimum and 19 ms maximum coherent integration periods, the non-coherent integration time required for detection of a signal using a conventional search engine is given as in Table 1. (A choice of 19 ms provides a long coherent integration period below 1 bit and ensures that the bit periods slide continuously through the coherent integration periods. This results in a loss of 1.2 dB but avoids any requirement for data synchronization.) For 5 ms coherent integration the non-coherent integration periods required would be much longer.

TABLE 1

SEARCH ENGINE INTEGRATION TIME VS CONDITIONS

| CONDITION | RF SIGNAL LEVEL (Dbw) | IF C/No (dBHz) | INTEGRATION PERIOD (ms) |
|---|---|---|---|
| Open skies, directly above | −150 | 54 | 1 |
| Open skies, high elevation | −155 | 49 | 1 |
| Open skies, mid elevation | −160 | 44 | 2 |
| Open skies, low elevation/indoors, very strong signal | −165 | 39 | 6 |
| Open skies very low elevation/indoors, strong signal | −170 | 34 | 19 |
| Indoors, moderately strong signal | −175 | 29 | 88 |
| Indoors, weak signal | −180 | 24 | 599 |
| Indoors, very weak signal | −185 | 19 | 5270 |
| Indoors, extremely weak signal | −190 | 14 | 51500 |

The lower the signal to noise ratio prior to squaring the higher the squaring loss and this is the reason that the required integration period rises exponentially. This, in turn, is the reason why it is essential to acquire satellites in parallel and hence why multiple search engines are needed.

However, the integration period required for the processing scheme of the invention is less because much longer coherent integration periods are employed thereby reducing the squaring losses.

Table 2 compares the integration periods and acquisition times of 3 schemes for very weak to extremely weak signals. The hardware employed in the 3 schemes is a search engine of around 16,000 fingers plus, say, 12 correlators. This is just an example. Similar analyses can be performed for other search engine configurations and the results in all cases favor the use of the algorithms of the invention either running in firmware using the correlators or in the form of a hardware mechanization as in FIG. 9.

The first scheme uses the Search Engine only with 5 ms coherent integration periods. The second scheme uses the search engine sequentially with 19 ms integration periods for acquisition and the correlators for tracking. Only 2 steps are required as all remaining satellites can be acquired in parallel after the first satellite is acquired. The full search engine is used to search for 2 satellites in parallel in the first step. The third scheme uses a DFT search engine and a hardware mechanization of the algorithms of the invention for sequential acquisition along with correlators and firmware based on the algorithms of the invention for tracking. Three search steps are required, 2 for the first satellite and one for the remainder.

TABLE 2

INTEGRATION PERIOD & ACQUISITION TIME FOR SEARCH ENGINE Vs THE INVENTION

| Sensitivity (dBW) | SCHEME 1 Search Engine Acquisition Time With 5 ms Coherent IP (s) | Search Engine Integration Period With 19 ms Coherent IP (s) | SCHEME 2 Acquisition Time With 19 ms Coherent IP (s) and Tracking | Worst Case Integration Period (s) For The Invention | SCHEME 3 Modified Search Engine Acquisition Time (s) |
|---|---|---|---|---|---|
| −185 to −187 | 38.2 | 15.2 | 30.4 | 4.2 | 12.6 |
| −186 to −188 | 60.3 | 24.0 | 48 | 5.4 | 16.2 |
| −187 to −189 | 95.1 | 37.8 | 75.6 | 8.3 | 24.9 |
| −188 to −190 | 154.7 | 60.2 | 120.4 | 13.1 | 39.3 |

To allow for 20 km of initial position uncertainty we require a search range of at least 60 chips after acquisition of the first satellite. This determines the number of search engine fingers required after acquiring the first satellite. This is 480 per satellite for scheme 2 and 3,600 for scheme 3 which means that, in both cases, four or more of the remaining satellites can be acquired in parallel.

As we have seen, Scheme 1 requires the longest acquisition time and hence the highest energy requirement for the first fix. Moreover, subsequent fixes require equally as much energy as the satellites must be acquired from scratch again. Using the invention for tracking, however, the energy required for subsequent fixes can be greatly reduced in 2 ways. Firstly, the power hungry search engine can be turned off. Secondly, the entire receiver can be duty cycled over quite long periods to achieve considerable savings. A Timer must be used to turn the receiver back on after a period precisely known to within a few microseconds. Then the code generators can be shifted close to the tracking codephase prior to a brief reacquisition search using the invention implemented in firmware. Since only the correlators are used the energy requirement is substantially less than would be the case for the first fix.

Satellite Signal Processing Algorithms

As previously noted, special processing of the weak satellite signal is required in order to determine its code phase differences for purposes of calculating a PV solution from them. To this end, the invention utilizes an algorithm to measure amplitude, frequency and phase of the satellite signal. The invention also applies a smoothing procedure to the code phase measurements and the carrier frequency estimates to reduce random errors occurring over time. Finally, a formula is applied to convert the code phase differences into a precise position and velocity solution. Each algorithm is addressed in turn.

(1) Estimating Amplitude, Frequency and Phase of Weak Satellite Signal

Any SPS Receiver 1 employing a hardware correlator 18 with several signals in each channel is required to estimate the amplitude of the carrier in each of those several signals in the presence of the data. In a conventional receiver a phase locked loop or a frequency locked loop and a delay locked loop control the frequency of the final down converter 21 and the code generator 24 respectively. In the weak signal case however, the signals are too weak to permit lock-in without the use of some sort of aiding from an auxiliary algorithm. The signal processing algorithms of the present invention could be used as auxiliary algorithms for acquisition or they may be used independently of any phase-locked or frequency-locked loop for both acquisition and tracking.

With strong signals it is possible to detect a signal from individual correlator output samples 29 with sufficient reliability to permit lock-in. In the weak signal case, the correlator output samples 29 are so noisy that the signal is indistinguishable from the noise unless the correlator output sampling rate is extremely low (e.g. 8 Hz for GPS). However, to avoid the Decimators 28 filtering out the residual carrier at such a low sampling rate, the Doppler frequency and the crystal oscillator offset would have to be known to an impractical high precision. Accordingly, a higher correlator output sampling rate needs to be retained and a suitable algorithm is required to estimate the amplitude of the residual carrier signals in the code phase measurements 32.

Figure 4:
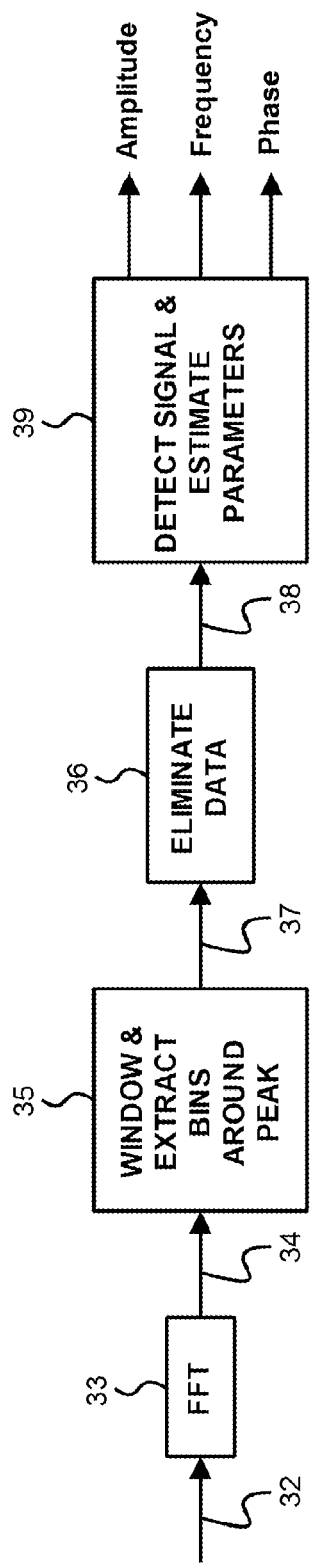
FIG. 4 is a block diagram describing the signal processing algorithm used to measure amplitude in each of an early and a late arm of each channel of the correlator according to one embodiment of this invention.

FIG. 4 depicts a flow chart for an algorithm used to measure amplitude, frequency and phase of the signal from each of the early and late mixed signals 29 of the correlator 18 according to one embodiment of this invention. Referring to FIG. 4, the procedure involves the use of a Fast Fourier Transform 33 applied to a block of samples from the code phase measurements 32 of the correlator 18. The effect of this algorithm is to compress the residual carrier signal into a few bins of the FFT output 34. Thus, whereas the satellite signal is undetectable when its energy is spread across all of the time domain samples contained in the code phase measurements 32, it is detectable in the bins of the FFT output 34. However, its amplitude is not readily estimated because the data modulation splits the satellite signal between several adjacent bins in a semi-random manner depending on where the transition falls in relation to both the integration period and the phase of the residual carrier at that instant.

Nevertheless, having detected the probable presence of a satellite signal it is possible to reject much of the noise by applying a window operation 35 on the bins of the FFT output 34 centered on the peak value. More distant bins may be discarded completely. This is simply a filtering operation and significantly improves the signal-to-noise ratio prior to non-linear processing 36 of the window-filtered signal 37 to eliminate the data transitions. The remaining windowed bins in the window-filtered signal 37 may be processed in one of several ways in order to estimate the amplitude in the presence of the noise and data as follows:

1. The discarded bins may be zero filled and the complete set of bins can then be inverse transformed back to the time domain. This would result in a set of time domain samples with significantly improved signal to noise ratio which may then be processed such as to effect lock-in of a phase locked loop or delay locked loop.

2. An inverse transform may be effected as described above and the time domain samples may be squared to remove the data. The amplitude of the resulting signal could then be estimated by transforming back into the frequency domain using a DFT to obtain a few bins centered on the previous FFT peak and applying any estimation algorithm suitable for estimating the amplitude and frequency of a cissoid embedded in noise based on the values of several FFT bins. It is important to note that one effect of squaring the signal will be to double the frequency of the residual carrier signal such that it may be aliased by the samples. This ambiguity will need to be resolved when determining the frequency.

3. The vector of remaining windowed bins may be autoconvolved to remove the data in an autoconvolution process 36. This is equivalent to squaring in the time domain but, if the number of bins in window filtered signal 37 is small compared to the size of the FFT 33, then the autoconvolution process 36 may be less computationally costly than the process described in option 2 above. The autoconvolved samples 38 can then be processed by any estimation algorithm 39 suitable for estimating the amplitude and frequency of a cissoid embedded in noise based on the values of several FFT bins. Again it is important to realize that the frequency corresponding to each bin has been doubled by the autoconvolution process 36 and the bin width has thus been effectively halved for the purposes of frequency estimation.

An embodiment of the invention employs option 3 for estimation of the amplitude and residual carrier frequency. The RF carrier frequency is estimated as follows:

$$Fc = Fd1 + Fd2 + (Np1 + (Np2 - Nnom + N\psi)/2)*Fbin - \psi Fxo*Fnom/Fxo$$

Where:

Fc is the RF carrier frequency;

Fd1 is the total frequency shift due to the front-end down conversion;

Fd2 is the frequency shift due to the down conversion in the correlator;

Np1 is the bin number (between $-N/2$ and $(N/2+1)$) for an N-point FFT of the peak in the FFT (which is the center bin of those extracted for performing the autoconvolution);

Np2 is the bin number of the peak bin in the autoconvolved bins computed (which is the center bin of those extracted for estimating the amplitude and frequency);

Nnom is the bin number of the nominal peak bin in the autoconvolved bins computed (i.e. corresponding to zero lag);

$N\psi$ is the frequency adjustment (in bins and fractions of bins relative to Np2) estimated by analysis of several adjacent bins of the autoconvolved bins computed;

Fbin is the bin width of the original FFT;

$\psi Fxo$ is the crystal oscillator offset from its nominal frequency;

Fnom is the nominal RF carrier frequency of the signal; and

Fxo is the nominal crystal oscillator frequency.

While the signal is being tracked it is possible to reduce the computational load of the signal processing, if this is desirable, by utilizing the precise value of the residual carrier frequency as estimated in the previous integration period. For example, only those bins used in the previous integration period need be computed.

Ensemble Averaging Scheme

The coherent algorithm is limited in sensitivity owing to the fact that gains resulting from the reduction of binwidth are offset by squaring losses. A more refined averaging scheme has been tested and seems preferable.

The basic concept of this scheme is to extract the signal power spectrum from the noise by averaging. Because the phase information is lost in computing the power spectrum, the MacLeod estimation algorithm must be replaced by the less efficient (in an estimation performance sense) Jain algorithm for estimating amplitude and frequency for detection and carrier tracking. However, the consequent degradation in estimation performance is more than offset by the improved sensitivity possible. Nevertheless, when shorter integration periods are required, the MacLeod scheme should be retained.

To avoid excessive memory usage for storing FFT arrays, the scheme must operate in the fashion of a moving average rather than by block averaging. This implies running a filter on the squared magnitude of the autoconvolution array for each channel. For smooth startup, such a filter should be of a simplified Kalman style.

The first difficulty to be faced in implementing such a scheme is that the autoconvolutions are normally performed on windowed FFT values and the window is centered on the peak value of the FFT during acquisition. This is not the case when tracking as the center of the window is predetermined. Hence the scheme outlined above is very suitable for tracking but needs augmenting for acquisition as the peak picking of the individual FFTs will not be reliable at the low signal levels to be targeted.

Figure 10:
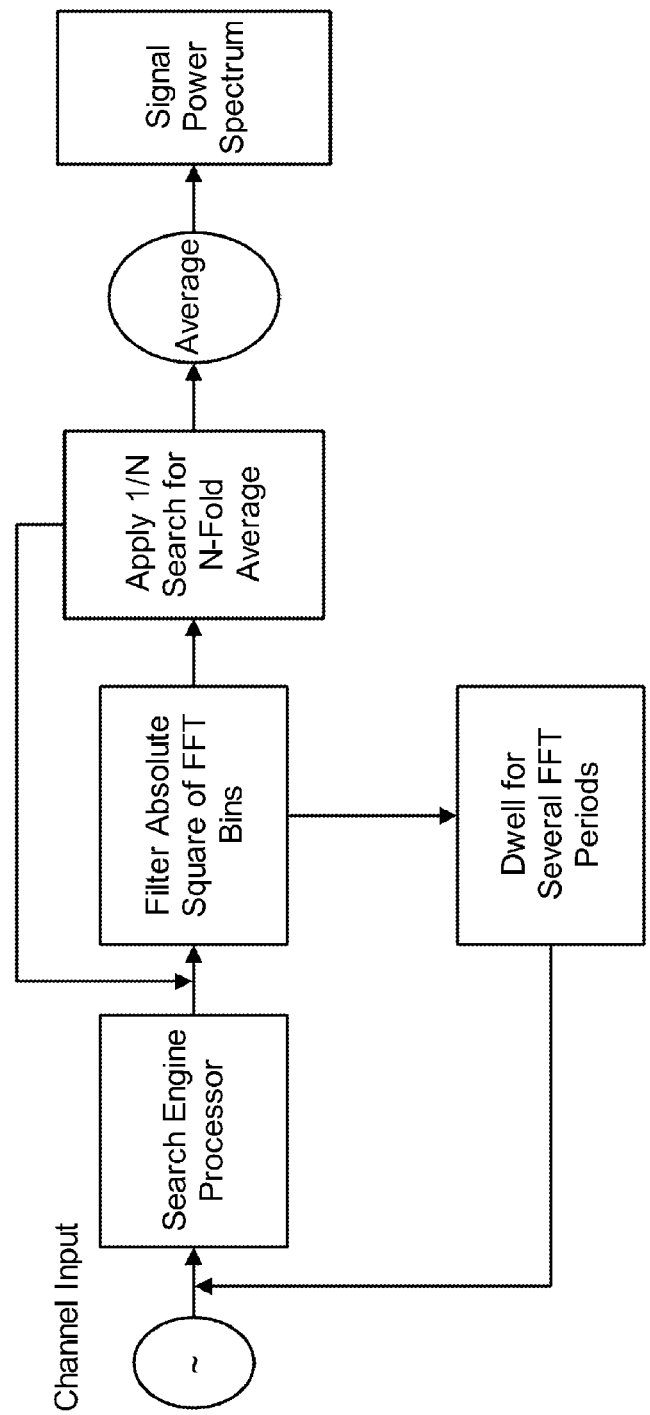
FIG. 10 is a schematic representation of an ensemble averaging scheme.

FIG. 10 is a schematic representation of an ensemble averaging scheme. The solution proposed for this problem is to filter the squared magnitudes of the FFT bins in the same fashion as for the autoconvolutions when acquiring. One way to facilitate this would be to dwell for several FFT periods at each code search step. An alternative approach would be to step very slowly at each FFT period. (ie for N-fold averaging apply 1/Nth of the normal search step size.) The autoconvolution and later processing could be performed at each step as normal with no ill effects. Since the steps will be very small, the signal spectra will be present for many steps, consistent with the averaging period, as required. There will be a lag between the signal appearing and actually being incorporated into the autoconvolution average because the FFT average may not produce the correct peaks initially. However, this should not pose a serious difficulty and can be taken account of by adjusting the capture process as necessary.

Finally, we need to consider the impact of this new scheme on the tracking control algorithms. The approach proposed is to perform partial control adjustments consistent with the averaging period. For example, if the averaging period is N FFTs then the feedback at each should be applied with 1/Nth of the normal gain.

Simulations of block averaging were conducted to confirm the increases in sensitivity expected. An FFT size of 128 was used with windows of 15 bins before and after autoconvolution. The Jain algorithm was used to estimate the amplitude. Statistics were accumulated over 1,000 runs.

The mean, standard deviation and 99th percentile value of the amplitude estimates were computed with no signal present. Then the signal amplitude required to make the tenth percentile value equal to the No Signal $99^{th}$ percentile was determined by iteration. The mean and standard deviation of the amplitude estimate were recorded for this actual signal amplitude. This whole process was repeated for many different averaging periods.

Table 3 shows the results obtained form the simulations. The predicted sensitivity is consistently nearly 3 dB better than that predicted using a detailed spreadsheet analysis. This is because the simulation does not simulate the losses due to quantization and correlation offset which amount to 1.8 dB before squaring and more after squaring. After taking this into account the simulations confirm the analysis well.

One problem that is evident is that the signal amplitude estimates drift further and further away from the true amplitudes. At the same time the noise amplitude standard deviation decreases more rapidly than the mean noise amplitude. This suggests that the amplitude estimates could all be adjusted by subtracting a factor that depends on the value of N, the averaging length. The table shows the effects of applying such an adjustment based on the empirical results. This will not affect delectability and has no other adverse characteristics. Therefore, it is proposed to use a look up table based on these results for the purpose of applying the adjustment. (Note that the adjustment for N=1 should be 0.0.)

TABLE 3

ANALYSIS OF SIMULATION RESULTS
TABLE 3 ANALYSIS OF SIMULATION RESULTS

| Detectable Signal Amplitude | Detectable C/No (dBHz) | Predicted Sensitivity (dBHz) | Amplitude Measurement With Noise Only | | Expected Noise StDev | Amplitude Measurement With Noise + Signal | | Threshold | Amplitude Offset | Adjusted Amplitude Measurement With Noise Only | | Adjusted Amplitude Measurement With Noise + Signal | | Adjusted Threshold |
|---|---|---|---|---|---|---|---|---|---|---|---|---|---|---|
| | (dBHz) | (dBHz) | Mean | StDev | StDev | Mean | StDev | | set | Mean | StDev | Mean | StDev | |
| 11.2 | 24.3 | 26.7 | 7.37 | 0.79 | 0.79 | 11.51 | 1.48 | 9.40 | 0.31 | 7.06 | 0.79 | 11.2 | 1.48 | 9.09 |
| 8.8 | 22.3 | 25.0 | 6.81 | 0.59 | 0.56 | 9.61 | 1.01 | 8.30 | 0.81 | 6 | 0.59 | 8.8 | 1.01 | 7.49 |
| 7.2 | 20.5 | 23.3 | 6.43 | 0.44 | 0.40 | 8.47 | 0.7 | 7.50 | 1.27 | 5.16 | 0.44 | 7.2 | 0.7 | 6.23 |
| 5.9 | 18.8 | 21.7 | 6.12 | 0.32 | 0.28 | 7.59 | 0.48 | 6.90 | 1.69 | 4.43 | 0.32 | 5.9 | 0.48 | 5.21 |
| 5.1 | 17.5 | 21.2 | 6.05 | 0.29 | 0.25 | 7.12 | 0.41 | 6.80 | 2.02 | 4.03 | 0.29 | 5.1 | 0.41 | 4.78 |
| 5 | 17.3 | 20.4 | 5.95 | 0.25 | 0.21 | 7.01 | 0.35 | 6.60 | 2.01 | 3.94 | 0.25 | 5 | 0.35 | 4.59 |
| 4.9 | 17.2 | 20.1 | 5.92 | 0.23 | 0.20 | 6.94 | 0.33 | 6.50 | 2.04 | 3.88 | 0.23 | 4.9 | 0.33 | 4.46 |
| 4.2 | 15.8 | 19.3 | 5.81 | 0.18 | 0.15 | 6.55 | 0.23 | 6.20 | 2.35 | 3.46 | 0.18 | 4.2 | 0.23 | 3.85 |
| 3.6 | 14.5 | 17.2 | 5.7 | 0.12 | 0.10 | 6.24 | 0.17 | 6.00 | 2.64 | 3.06 | 0.12 | 3.6 | 0.17 | 3.36 |
| 3.1 | 13.2 | 16.1 | 5.66 | 0.1 | 0.08 | 6.06 | 0.12 | 5.90 | 2.96 | 2.7 | 0.1 | 3.1 | 0.12 | 2.94 |

The idea is to filter the autoconvolution and the FFT values. This means that there has to be a stored array for each channel containing the filtered value. One may as well use the same structure as for AutoConv except that the .Bins are real rather than complex. Use a simplified Kalman style approach to starting the filter but stop the convergence when the required Gain factor (<1) is reached.

The required Gain factor would be derived from a configuration parameter. It corresponds to the required sensitivity improvement in terms of signal power. If it is set to 1 then no filtering is needed.

Note that, when searching, the step size at each step should be a fraction (also 1/G) of the normal chip step rather than just one integration period.

It is proposed to use the required sensitivity in dBW as the configuration parameter. We could have one for tracking and another for acquisition. The Table 4 shows how G (=1/Gain) relates to the required sensitivity.

TABLE 4

FILTER GAIN VERSUS SENSITIVITY

| Required Sensitivity (dBW) | Required Sensitivity (dBHz) | G |
|---|---|---|
| −182 | 22 | 1 |
| −185 | 19 | 5 |
| −186 | 18 | 7 |
| −187 | 17 | 14 |
| −188 | 16 | 19 |

One wouldn't choose −188 for acquisition using a conventional correlator because of how slow the acquisition would be. However, one could choose it for tracking based on the theory that, if you need such sensitivity then you must be indoors and moving at walking pace. Alternatively, a modified search engine, as discussed elsewhere in this document, may be used for acquisition using this scheme.

Finally, G should be limited by the 20 dB threshold limitation also. This should override the configuration parameter.

The following pseudocode shows how the filter would be applied for the autoconvolution.

```
if (Tracking)
    Greq = Gtracking
else
    Greq = Gacq;
```

-continued

```
if (Greq < 1)
{
    if ( first time )
    {
        FiltAutoConv(Chan).Bins = AutoConv.Bins
        G = 1
    }
    else
    {
        K = 1/(1+G)
        FiltAutoConv(Chan).Bins = FiltAutoConv(Chan).Bins +
K*(Magsquared(AutoConv.Bins) − FiltAutoConv)
        if (Greq < G)
            G = (1−K)*G
    }
    FiltAutoConv(Chan).Peak = FindPeak(FiltAutoConv(Chan));
    FiltAutoConv(Chan).FFTPeak = FFTPeakA.Peak;
/*---------------------------------------------------------*/
    /* Perform Jain Signal Analysis.
    Jain(&FiltAutoConv(Chan),pEstSignal);
}
else
{
```

The algorithmic enhancement to the signal processing scheme avoids the need for impractical FFT lengths without unnecessarily limiting the sensitivity. The technique involves averaging of the power spectrum at both the FFT and autoconvolution stages. To keep memory requirements to practical levels, the scheme can be implemented using a filtering approach.

A simulation study has confirmed the effectiveness of the scheme in terms of improving the sensitivity with performance close to that predicted by detailed spreadsheet calculations. The study also yielded data that has allowed an amplitude adjustment calculation to be devised involving the use of a lookup table.

An implementation scheme has been proposed and implemented in prototype form with a significant improvement in sensitivity resulting.

(2) Signal Smoothing

Figure 5:
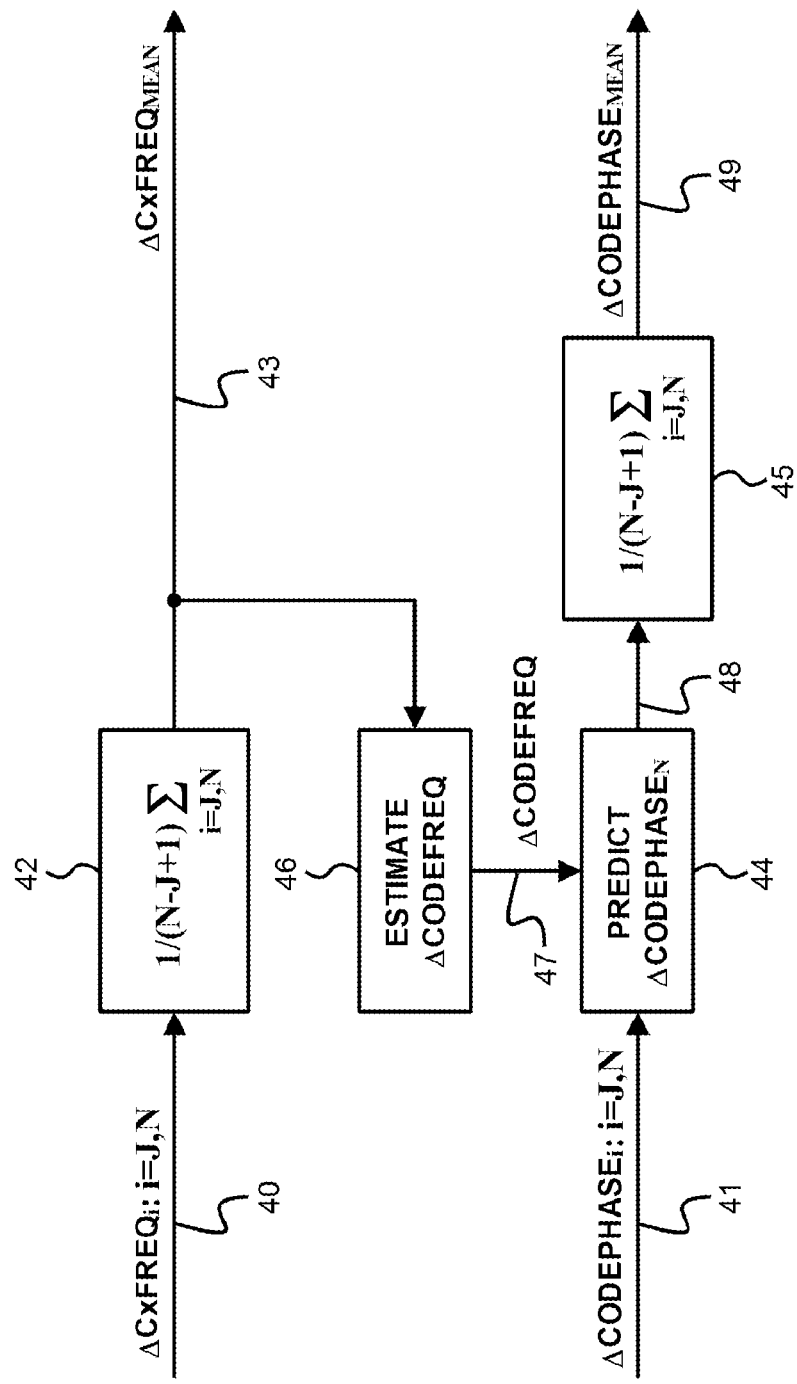
FIG. 5 is a block diagram describing the carrier smoothing algorithm used to reduce the error in the code phase measurements according to one embodiment of this invention.

While the signal is tracked the code phase and frequency estimates may be refined by a carrier smoothing process prior to being passed to the location solver. FIG. 5 depicts the flow of such a process. The algorithm illustrated is a block computation applied to the stored estimates from several integration periods (arbitrarily labeled from J to N) to compute a single set of measurements representing refined measurements for the final integration period.

In the preferred embodiment, the algorithm processes differences between the estimates from one satellite and those from all the others rather than processing the absolute estimates for individual satellites. The reason for this is that in the preferred embodiment of the location solver, differences rather than absolute estimates are used because differences can be processed without the need to take account of the frequency offset of the reference oscillator.

All of the frequency difference estimates 40 corresponding to a particular satellite signal are simply averaged in step 42. The average carrier frequency difference 43 is then used to predict forward in prediction step 44. This prediction step 44 is used for all but the latest code phase differences 41 for that satellite to the latest measurement instant before averaging them in step 45. The prediction step 44 uses an estimated Doppler offset of the code 47 determined from step 46 which is based upon the difference between the Doppler offsets of the carrier frequency (Fc1−Fc2). With the estimated Doppler offset of the code 47, step 44 is used to predict forward the code phase differences 41 by N integration periods using the following formula:

$$\psi p1 - \psi p2 = \text{Frac}(\psi m1 - \psi m2 + N*Tip/(Te*F\text{nom}/(Fc1-Fc2)))$$

where:

$\psi p1 - \psi p2$ is the predicted code phase difference 48 expressed as a fraction of a code epoch;

the Frac function yields the fractional component of the real argument;

$\psi m1 - \psi m2$ is the measured code phase (41) to be predicted forward;

Tip is the nominal integration period;

Te is the code epoch period as determined from the tracking algorithm.

All other quantities are as previously defined.

The predicted code phase differences are then averaged in step 45 to produce an average code phase difference 49.

(3) Position and Velocity Solution Computation Using Code Phase Differences

Figure 6:
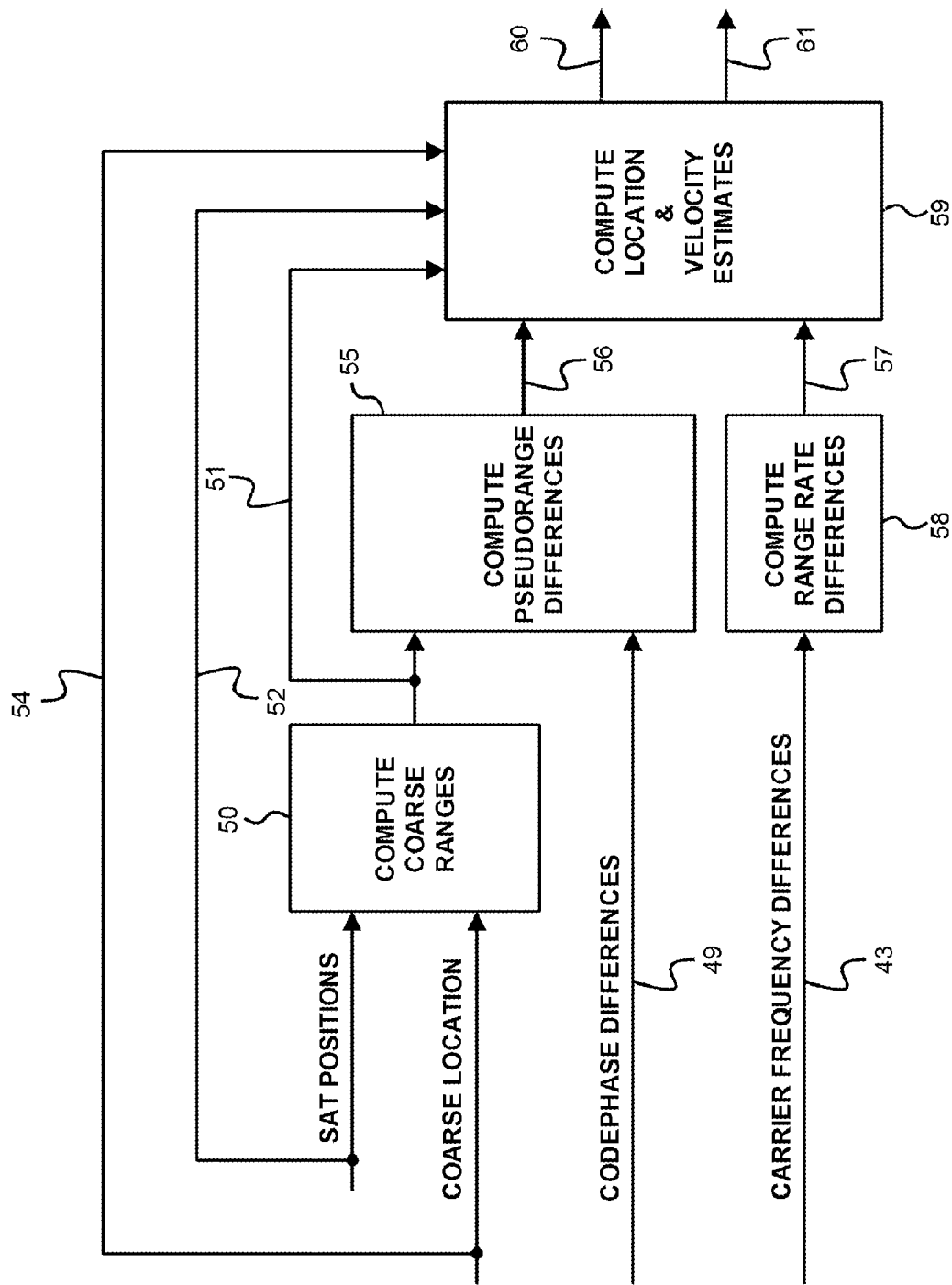
FIG. 6 is a block diagram describing the algorithm used to compute the location and velocity from the code phase and carrier frequency differences according to one embodiment of this invention.

As previously discussed, a PV solution is computed by the SPS Receiver 1 after code phase differences have been processed by the aforementioned smoothing algorithm. FIG. 6 illustrates the PV solution process used by a preferred location solver. The location solver, which computes the location and velocity using the refined average carrier frequency differences 43, the average code phase differences 49, the precise satellite positions 52 and the approximate receiver location 54 as follows.

In step 50, approximate ranges 51 to all of the satellites for which there are measurements are computed. Since the satellite positions 52 are supplied by the Aiding Source 2, this step simply involves the vector difference of the Cartesian coordinates of the satellite positions and the approximate location 54, which was also supplied by the Aiding Source 2. The vector magnitudes of these vector differences are approximate ranges 51.

In step 55, the epoch ambiguities are resolved and the average code phase differences 49 are converted into pseudorange differences 56. All of the approximate ranges 51 are subtracted from the approximate range of a reference satellite (as selected for computing the code phase differences) to give approximate range differences. These are saved for later use as well as being used in resolving the epoch ambiguities according to the following formula:

$$P1-P2 = \text{int}[(R1-R2)/c*Te-(Q1-Q2)+0.5]+(Q1-Q2)$$

Where:

C is the speed of light;

Te is the nominal epoch period;

P1 and P2 are the pseudoranges 56 of satellites 1 and 2;

R1 and R2 are the approximate range estimates for the same two satellites;

Q1−Q2 is the code phase difference between the same two satellites.

In step 58, the range rate differences 57 are calculated from the Doppler affected average carrier frequency differences 43. The range rate differences 57 are computed according to the formula:

$$d(R1-R2)/dt = -c*(Fc1-Fc2)/F\text{nom}$$

where:

c is the speed of light and $d(R1-R2)/dt$ is range rate difference 57 between satellite 1 and satellite 2.

In one alternative embodiment of the invention, the current location estimate 60 and current velocity estimate 61 are computed in step 59 by a method similar to that for a single update of a Kalman navigation filter in a traditional SPS receiver. In fact, if time allows, a true navigation filter can be run for several updates to further refine the estimated PV solution. (However, in this case the satellite positions will need to be updated from the Aiding Source 2.) The Kalman gain matrix, K, is given by the well-known equation:

$$K = PM^T(MPM^T+R)^{-1}$$

and $$X = X_{INIT} + K(Y - Y_{PRED})$$

where Y is the measurement vector and X is the solution state vector containing the location and velocity estimates.

Using this equation, the initial state vector, $X_{INIT}$, is set to the approximate location from the aiding source with zero velocity. The first prediction vector, $Y_{PRED}$, is set to the approximate range differences derived from the approximate ranges 51 and zero for the range rate differences 57.

The state covariance matrix, P, is initialized to a diagonal matrix with the entries representing the estimated variances of the approximate location and velocity estimates. The location variance estimates may be obtained from the Aiding Source 2 or a fixed value could be used. The initial velocity estimate is zero and its variance depends on the application. The measurement variances can be estimated as in a conventional receiver except that the measurement variance matrix, R, is no longer diagonal. The fact that differences with a reference satellite were computed means that the covariance terms between the satellites are half of the value of the variance estimates rather than zero as in a conventional receiver. The approximate location (54) and the satellite positions (52) can be used to determine the direction cosines and the direction cosine differences form the rows of the measurement matrix, M.

We claim:

1. A satellite-based positioning system for identifying a location of a receiver in the presence of satellite signal attenuation comprising:

a plurality of orbital satellites sending synchronized encoded signals that have repeated epochs containing synchronization data; and a receiver configured to:

detect, acquire, and track a set of the encoded signals transmitted by a set of the orbital satellites, simultaneously determine code phases of said set of encoded signals with respect to said epochs, receive aiding information broadcast from an aiding source, compute positions of the set of satellites using orbital coefficients hardcoded in the receiver for a number of satellite orbits and the received aiding information, and compute the position of the receiver based on said computed positions of the set of satellites and on pseudoranges derived from the code phases.

2. A receiver for identifying its location using a satellite-based positioning system including a plurality of orbital satellites sending synchronized encoded signals that have repeated epochs containing synchronization data, in the presence of satellite signal attenuation, the receiver configured to:

detect, acquire, and track a set of the encoded signals transmitted by a set of the orbital satellites, simultaneously determine code phases of said set of encoded signals with respect to said epochs, receive aiding information broadcast from an aiding source, compute positions of the set of satellites using orbital coefficients hardcoded in the receiver for a number of satellite orbits and the received aiding information, and compute the position of the receiver based on said computed positions of the set of satellites and on pseudoranges derived from the code phases.

3. The receiver of claim 2 further comprising a look-up table wherein said hardcoded orbital coefficients are stored.

4. The receiver of claim 2, wherein the received aiding information is related to at least some of the satellites that are visible to the receiver.

5. The receiver of claim 4, wherein the received aiding information includes a satellite identification, an identifier of the stored hardcoded orbital coefficients, and corrections to the orbital coefficients or additional orbital coefficients or corrections to the output after using the hardcoded orbital coefficients.

6. The receiver of claim 2, wherein the received aiding information includes a reference time of week.

7. A method for identifying a location of a receiver using a satellite-based positioning system with a plurality of orbital satellites sending synchronized encoded signals which have repeated epochs containing synchronization data, in the presence of satellite signal attenuation, the method, implemented in the receiver, comprising:

detecting, acquiring and tracking a set of encoded signals transmitted by a set of satellites of the satellite-based positioning system, simultaneously determining the code phases of said set of encoded signals, receiving aiding information broadcast from an aiding source, computing positions of the set of satellites using orbital coefficients hardcoded in the receiver for a number of satellite orbits and the received aiding information, computing the position of the receiver based on said computed positions of the set of satellites and on pseudoranges derived from said code phases.

8. The method of claim 7, wherein the said hardcoded orbital coefficients are read from a look-up table.

9. The method of claim 7, wherein the received aiding information is related to at least some of the satellites that are visible to the receiver.

10. The method of claim 9, wherein the received aiding information includes a satellite identification, an identifier of the stored hardcoded orbital coefficients, and corrections to the orbital coefficients or additional orbital coefficients or corrections to the output after using the hardcoded orbital coefficients.

11. The method of claim 9, wherein the received aiding information includes a reference time of week.

* * * * *